US007657578B1

(12) United States Patent
Karr et al.

(10) Patent No.: US 7,657,578 B1
(45) Date of Patent: Feb. 2, 2010

(54) SYSTEM AND METHOD FOR VOLUME REPLICATION IN A STORAGE ENVIRONMENT EMPLOYING DISTRIBUTED BLOCK VIRTUALIZATION

(75) Inventors: Ronald S. Karr, Sunnyvale, CA (US); Niranjan Pendharkar, Pune (IN); Anand A. Kekre, Pune (IN); Angshuman Bezbaruah, Pune (IN); Vikas Kailash Gupta, Santa Clara, CA (US); Ashish Agarwal, Mountain View, CA (US); Raghu Krishnamurthy, Santa Clara, CA (US); Michael Root, San Jose, CA (US); Kati Rader, Mountain View, CA (US); Kedar Karmarkar, Sunnyvale, CA (US)

(73) Assignee: Symantec Operating Corporation, Mountain View, CA (US)

( * ) Notice: Subject to any disclaimer, the term of this patent is extended or adjusted under 35 U.S.C. 154(b) by 714 days.

(21) Appl. No.: 11/017,356

(22) Filed: Dec. 20, 2004

(51) Int. Cl.
*G06F 17/30* (2006.01)

(52) U.S. Cl. .......................... 707/204; 707/10; 714/15; 711/162

(58) Field of Classification Search ....................... None
See application file for complete search history.

(56) References Cited

U.S. PATENT DOCUMENTS

| 5,544,347 | A | * | 8/1996 | Yanai et al. | .................. | 711/162 |
| 6,101,497 | A | * | 8/2000 | Ofek | ........................... | 707/10 |
| 6,209,002 | B1 | * | 3/2001 | Gagne et al. | ................. | 707/204 |
| 6,477,583 | B1 | | 11/2002 | Zayas et al. | | |
| 6,502,205 | B1 | * | 12/2002 | Yanai et al. | ..................... | 714/7 |
| 6,643,671 | B2 | * | 11/2003 | Milillo et al. | ............... | 707/204 |
| 6,668,264 | B1 | * | 12/2003 | Patterson et al. | ............ | 707/205 |
| 6,715,070 | B1 | | 3/2004 | Peloquin et al. | | |
| 6,735,603 | B2 | * | 5/2004 | Cabrera et al. | .............. | 707/200 |
| 6,754,792 | B2 | * | 6/2004 | Nakamura et al. | .......... | 711/162 |
| 6,981,114 | B1 | * | 12/2005 | Wu et al. | ..................... | 711/162 |
| 6,993,635 | B1 | * | 1/2006 | Gazit et al. | ................. | 711/162 |
| 7,111,194 | B1 | * | 9/2006 | Schoenthal et al. | ............ | 714/7 |
| 7,117,327 | B2 | * | 10/2006 | Hirakawa et al. | ........... | 711/162 |
| 7,139,885 | B2 | * | 11/2006 | Yamagami | .................. | 711/162 |
| 7,149,859 | B2 | * | 12/2006 | Fujibayashi | ................. | 711/162 |
| 7,392,425 | B1 | * | 6/2008 | Schoenthal et al. | ............ | 714/7 |
| 2003/0084242 | A1 | * | 5/2003 | Strange et al. | .............. | 711/114 |
| 2003/0126388 | A1 | * | 7/2003 | Yamagami | .................. | 711/162 |
| 2003/0182325 | A1 | * | 9/2003 | Manley et al. | .............. | 707/204 |
| 2003/0182494 | A1 | * | 9/2003 | Rodrigues et al. | ........... | 711/100 |

(Continued)

*Primary Examiner*—Apu M Mofiz
*Assistant Examiner*—Hung D Le
(74) *Attorney, Agent, or Firm*—Meyertons, Hood, Kivlin, Kowert & Goetzel, P.C.; B. Noel Kivlin

(57) ABSTRACT

A system for volume replication in a distributed block virtualization environment includes a first and a second set of one or more physical block devices, a first and a second volume server, one or more volume clients, and a replication manager. The first volume server may be configured to aggregate storage in the first set of one or more physical block devices into one or more logical volumes, and to make the one or more logical volumes accessible to the one or more volume clients. The replication manager may be configured to operate in cooperation with the first and second volume servers and the one or more volume clients to maintain a replica of at least a subset of the one or more logical volumes at the second set of one or more physical block devices.

27 Claims, 13 Drawing Sheets

U.S. PATENT DOCUMENTS

| | | | |
|---|---|---|---|
| 2004/0098425 A1* | 5/2004 | Wiss et al. | 707/204 |
| 2004/0123063 A1* | 6/2004 | Dalal et al. | 711/170 |
| 2004/0133611 A1* | 7/2004 | Cabrera et al. | 707/203 |
| 2004/0205310 A1* | 10/2004 | Yamagami | 711/162 |
| 2004/0205391 A1 | 10/2004 | Thompson | |
| 2004/0250034 A1* | 12/2004 | Yagawa et al. | 711/162 |
| 2004/0254964 A1* | 12/2004 | Kodama et al. | 707/204 |
| 2004/0260873 A1* | 12/2004 | Watanabe | 711/114 |
| 2005/0050115 A1 | 3/2005 | Kekre | |
| 2005/0108292 A1 | 5/2005 | Burton | |
| 2005/0125465 A1* | 6/2005 | Arakawa et al. | 707/204 |
| 2005/0125609 A1 | 6/2005 | Satoyama | |
| 2005/0138089 A1 | 6/2005 | Kasai | |
| 2005/0160248 A1* | 7/2005 | Yamagami | 711/170 |
| 2005/0193245 A1* | 9/2005 | Hayden et al. | 714/13 |
| 2006/0080362 A1* | 4/2006 | Wagner et al. | 707/200 |

* cited by examiner

SYSTEM AND METHOD FOR VOLUME REPLICATION IN A STORAGE ENVIRONMENT EMPLOYING DISTRIBUTED BLOCK VIRTUALIZATION

BACKGROUND OF THE INVENTION

1. Field of the Invention

This invention relates to computer systems and, more particularly, to replication in storage environments employing distributed block virtualization techniques.

2. Description of the Related Art

Many business organizations and governmental entities rely upon applications that access large amounts of data, often exceeding a terabyte or more of data, for mission-critical applications. Often such data is stored on many different storage devices, which may be heterogeneous in nature, including many different types of devices from many different manufacturers.

Configuring individual applications that consume data, or application server systems that host such applications, to recognize and directly interact with each different storage device that may possibly be encountered in a heterogeneous storage environment would be increasingly difficult as the environment scaled in size and complexity. Therefore, in some storage environments, specialized storage management software and hardware may be used to provide a more uniform storage model to storage consumers. Such software and hardware may also be configured to add storage features not present in individual storage devices to the storage model. For example, features to increase fault tolerance, such as data mirroring, snapshot/fixed image creation, or data parity, as well as features to increase data access performance, such as disk striping, may be implemented in the storage model via hardware or software.

In order to protect against a complete loss of such a storage environment (e.g., in the event of a natural disaster or a terrorist attack), it may be desired to implement a disaster recovery plan and/or system. A common technique that may be employed for disaster recovery in some environments is the production of tape-based data backups periodically (e.g., once a day) at a primary data center for shipment to an offsite or secondary data center. The storage environment of the primary data center may be replicated if needed at the secondary data center using the tape-based data backups. However, producing tape-based backups of a large, distributed storage environment handling frequent updates may be unacceptably slow for some data centers, and the time taken for recovery using a tape-based solution may also be unacceptably long. In order to speed up replication, hardware storage devices designed specifically for rapid replication operations (such as hardware snapshot devices) may be employed in other storage environments. This approach may also have drawbacks: for example, different hardware replication devices may be incompatible with each other, and the owner of the storage environment may prefer not to be tied to a specific hardware device vendor. Furthermore, hardware replication devices may not allow users the flexibility of replicating a subset of data, rather than the entire set of data, located on a given storage device, some of which may not be required for disaster recovery. A hardware-device-independent mechanism that allows storage consumers to flexibly and quickly replicate the data of a complex distributed storage environment may therefore be desirable.

SUMMARY OF THE INVENTION

Various embodiments of a system and method for volume replication in a storage system employing distributed block virtualization are disclosed. According to a first embodiment, a system may include a first and a second set of one or more physical block devices, a first and a second volume server, one or more volume clients, and a replication manager. The first volume server may be configured to aggregate storage in the first set of one or more physical block devices into one or more logical volumes, and to make the one or more logical volumes accessible to the one or more volume clients. The replication manager may be configured to operate in cooperation with the volume servers and the volume clients to maintain a replica of at least a subset of the one or more logical volumes at the second set of one or more physical block devices. Data required for the replica may be transferred by or in cooperation with a first component of the replication manager from a primary data center to a second component of the replication manager at a secondary data center over a Wide Area Network (WAN) or over the Internet. The second volume server may make the replica accessible to volume clients under certain conditions: for example, in the event of a disaster or failure, or in response to a request for a stable point-in-time image of the replicated data, or in response to an administrative request.

In one specific embodiment, the replication manager may be configured to operate in cooperation with the first volume server and the volume clients to maintain one or more logs of the write operations performed on the at least a subset of the one or more logical volumes, and to perform a set of replication write operations at the second set of one or more block devices in an order that preserves the contents of the logs and does not violate write order fidelity. In another embodiment, a first volume client may be hosted at a first node of a cluster of two or more nodes, and the replication manager may designate a second cluster node as a log owner node for maintaining the replication log or logs. Requests to perform data write operations from the volume client may be directed to the log owner node by the replication manager. The replication manager may be configured to send a message indicative of a successful completion of the data write when an entry for the data write request has been created in the replication log.

Several other embodiments are also disclosed. According to one other embodiment, a logical volume may be configured as a mirrored logical volume. The replication manager may be configured to remove a first mirror from the mirrored logical volume and to synchronize contents of the first mirror with a second logical volume at the second set of one or more physical block devices. In an embodiment where the mirrored volume includes four or more mirrors, the replication manager may also be configured to iteratively perform the following steps to incrementally replicate recently updated data from the mirrored volume at the second volume: remove a second mirror from the mirrored volume containing data updated after the first mirror was removed, reattach the first mirror to the mirrored volume, synchronize contents of the second volume with the second mirror, remove the first mirror from the mirrored volume containing data updated after the second mirror was removed, reattach the second mirror to the mirrored volume, and synchronize contents of the second volume with the first mirror. In using two of the four or more mirrors alternately as replication sources in this manner, the replication manager may reduce the impact of replication operations upon normal operations concurrently being performed at the mirrored volume.

Figure 1:
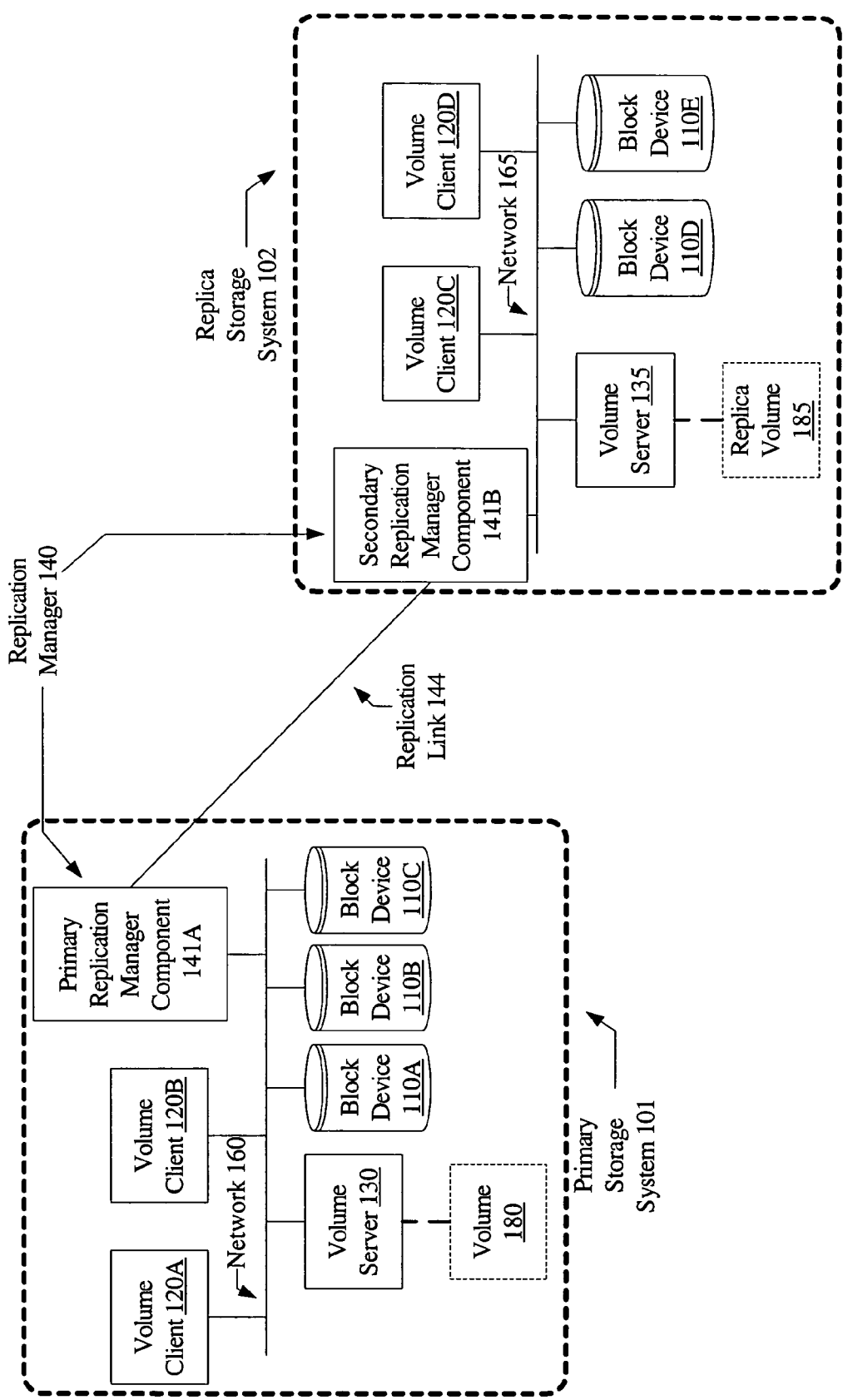
FIG. 1 is a block diagram illustrating a primary storage environment and a replica storage environment according to one embodiment.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates a primary storage system 101 and a replica storage system 102 according to one embodiment. In the illustrated environment, primary storage system 101 includes block devices 110A-C, a volume server 130, and volume clients 120A-B coupled to a network 160. Replica storage system 102, which may also be known as a secondary storage system, includes block devices 110D-E, a volume server 135, and volume clients 120C-D coupled to a network 165. A replication manager 140 includes a primary component 141A at primary storage system 101, a secondary component 141B, and a replication link 144 for communication between the primary and secondary components. Volume server 130 may be configured to aggregate storage within block devices 110A-C into a logical volume 180, as described in further detail below. Replication manager 140 may be configured to operate in cooperation with volume servers 130 and 135, and with volume clients 120A-B, to maintain a replica of volume 180 (replica volume 185) using storage at block devices 110D-E of replica storage system 102, in order to be able to provide distributed virtualization functionality for data originally stored in block devices 110A-C in the event of a failure or disaster at primary storage system 101. As also described below in further detail, replication manager 140 may be configured to cooperate with volume server 130 and volume clients 120A-B to transfer data and configuration information for volume 180 from primary storage system 101 to replica storage system 102 over replication link 144 using a variety of techniques to create replica volume 185. Volume server 135 may be configured to provide access to the replica volume 185 to volume clients 120A and 120B under various conditions: for example, in response to a failure or disaster at primary storage system 101, in response to an administrative request, or in response to a request for a stable point-in time image or a frozen image. In some embodiments, volume server 135 may be configured to make replica volume 185 accessible to additional volume clients 120C and 120D.

In order to provide robust disaster recovery for applications utilizing volume 180, in some embodiments replica storage system 102 may be hosted at a secondary data center that may be geographically remote from a primary data center hosting primary storage system 101. For example, primary storage system 101 may be located at a primary data center at the headquarters of a corporation in San Jose, Calif., while replica storage system 102 may be located at a secondary data center in London, England. By locating primary storage system 101 and replica storage system 102 far from each other, the likelihood of a single disaster (such as an earthquake, a fire, a sustained power outage or a terrorist attack) resulting in both storage sites becoming unavailable may be reduced. The geographical distance between primary and secondary data centers may impact the speed with which data required for replication may be transferred between primary and secondary data centers, and may also affect the performance of other applications unrelated to replication, as described below in further detail.

As shown in FIG. 1, primary storage system 101 and replica storage system 102 may both utilize block storage devices (devices 110A-C and 110D-E respectively). Generally speaking, a block device 110 may comprise any hardware or software entity that provides a collection of linearly addressed data blocks that can be read or written. For example, in one embodiment a physical block device 110 may be a single disk drive configured to present all of its sectors as an indexed array of blocks. It is contemplated that any suitable type of storage device may be configured as a block device, such as fixed or removable magnetic media drives (e.g., hard drives, floppy or Zip-based drives), writable or read-only optical media drives (e.g., CD or DVD), tape drives, solid-state mass storage devices, or any other type of storage device. In some embodiments, a block device 110 may also be a logical or virtual storage device resulting from a mapping of blocks of one or more physical storage devices, as described in greater detail below.

Hardware devices configured to provide a collection of linearly addressed data blocks may generally be referred to as physical block devices, and logical or virtual storage devices so configured may generally be referred to as logical or virtual block devices. It is contemplated that in some embodiments, data blocks may be uniformly sized across different physical and logical block devices, while in other embodiments physical and logical block devices may employ different block sizes. It is also contemplated that in some embodiments, block sizes may vary among particular physical block devices and/or particular logical block devices, or even within a given block device.

A block device may differ from a file in that it may not require use of a file system for access; that is, a consumer of a block device 110 may read or write blocks directly to the device, bypassing any file system that may be in use. In some embodiments, a block device 110 presented by an operating system for use by a consumer may present relatively few primitives through which the device may be manipulated. For example, in one embodiment a block device 110 may support open, close, read and write primitives, plus a few miscellaneous control and query primitives. In contrast, file systems may provide a richer set of primitives, such as support for creating and removing files, appending to files, creating and removing directories, etc. Typical interfaces to block devices may allow for higher raw throughput and greater concurrency than typical interfaces to single files of a file system. Block devices 110 that are physical storage devices, such as disks or tape drives, may be configured to present some form of SCSI interface, though other interfaces are possible and contemplated.

Generally speaking, a volume 180 (which may also be referred to herein as a logical volume) may comprise a block device that may be presented directly for use by a block device consumer, e.g., a volume client 120. In one embodiment, a volume client 120 may be a file system or an application (such as a database application, for example) that can directly use block devices. As described in greater detail below, in some embodiments employing block device virtualization, a given volume 180 may be associated with several logical or physical block devices. In such embodiments, each block device included in the logical organization of a given volume or virtualized block device may be referred to as a storage object or logical storage object.

A volume may differ from a block device interface implemented in a hardware device or that is accessed through a system disk driver, in that the latter block devices may not present a system-independent block device interface that can be opened for direct use by a consumer. Instead, a system-dependent disk driver may be required to access such block devices. In embodiments employing block virtualization, such a disk driver may be generally unaware of block virtualization and may in some instances present a barrier to using some virtualization techniques, whereas a volume implementing various block virtualization features may be directly accessible by a consumer without the issues presented by such disk drivers.

A volume manager, such as volume server 130, may introduce virtualization of blocks, creating some number of virtualized block devices out of one or more physical or logical block devices. (In some embodiments, devices such as disk arrays and virtualization switches may also be configured to perform block virtualization.) In one embodiment of block virtualization, one or more layers of software and/or hardware rearrange blocks from one or more block devices, such as disks, and add various kinds of functions. The resulting rearranged collection of blocks may then be presented to a block device consumer, such as an application or a file system, as one or more aggregated devices with the appearance of one or more basic disk drives. That is, the more complex structure resulting from rearranging blocks and adding functionality may be presented as if it were one or more simple arrays of blocks, or logical block devices. It is noted that a virtualized block device may also be referred to as a logical block device, and that in some embodiments, multiple layers of virtualization may be implemented. That is, one or more block devices may be mapped into a particular virtualized block device, which may be in turn mapped into still another virtualized block device, allowing complex storage functions to be implemented with simple block devices.

In various embodiments, block virtualization can support the creation of virtualized block devices implementing numerous different types of storage functions. For example, in one embodiment a virtualized block device may implement device striping, where data blocks may be distributed among multiple physical or logical block devices, and/or device spanning, in which multiple physical or logical block devices may be joined to appear as a single large logical block device. In some embodiments, virtualized block devices may provide mirroring and other forms of redundant data storage, the ability to create a snapshot or static image of a particular block device at a point in time, and/or the ability to replicate data blocks among storage systems connected through a network such as a local area network (LAN) or a wide area network (WAN), for example. Additionally, in some embodiments virtualized block devices may implement certain performance optimizations, such as load distribution, for example, and/or various capabilities for online reorganization of virtual device structure, such as online data migration between devices. Block virtualization may provide any or all of these capabilities in a fashion transparent to virtualized block device consumers. That is, virtualized block devices may appear as generic storage devices to consumers such as file systems and applications.

Volume server 130 may provide functions such as configuration management of virtualized block devices and distributed coordination of block device virtualization. For example, in one embodiment volume server 130 may be aware of the type and quantity of physical storage devices, such as block devices 110, that are available within a storage system. In various embodiments, the virtualization functions provided by volume server 130 may be provided at different levels in the storage hierarchy between a volume client 120 and block devices 110.

For example, in one embodiment, volume clients 120 may be provided with a description of a virtualized block device and may be configured to directly access constituent block devices comprising the virtualized device. Such virtualization may also be referred to as host-based or client-based virtualization. In response to a request to configure a virtual block device, for example according to a desired set of virtualization features, volume server 130 may be configured to build a volume description that describes how a collection of storage objects compliant with the desired features maps to underlying physical block devices. The volume description identifying a particular volume 180 may be distributed to one or more volume clients 120. In one embodiment, such a volume description may be a tree of storage objects such as described in greater detail below in conjunction with the description of FIG. 2. Each volume client 120 may be configured to interact with volume server 130 for certain functions, for example management or administrative functions. For typical block read and write activity, each volume client 120 may be configured to interact directly with various block devices 110 according to the volume description distributed by volume server 130.

The structure of the volume 180, for example as indicated by its corresponding storage object tree, may indicate to a given volume client 120 how the volume relates to one or more underlying physical storage devices. In one embodiment, the leaf nodes of such a tree may correspond to one or more physical block devices such as block devices 110, and the root node of such a tree may be a logical block device through which the volume is accessed by a consumer. Distribution of a virtualized block device as a volume to one or more volume clients 120 may also be referred to as distributed block virtualization. In some embodiments, after volume server 130 has distributed a volume description of a given virtual block device to a given volume client 120 as a particular volume 180, the given volume client 120 may interact with that particular volume 180 to read and write blocks without further involvement on the part of volume server 130, as described above. That is, the given volume client 120 may use the structure of the particular volume 180 to transform I/O requests generated by various consumers of that volume 180 into I/O requests directed to specific physical storage devices, such as block devices 110.

In some embodiments, details of block virtualization may not be directly available to individual volume clients 120. In some such embodiments, the virtualization function of volume server 130 may be implemented in a device or layer of abstraction in between volume clients 120 and block devices 110, such as a switch or virtualization appliance. Such virtualization may also be referred to as switch-based or appliance-based virtualization.

Additionally, in some embodiments, multiple layers of virtualization may be employed, for example at the host level as well as at the switch or appliance level. In such embodiments, some aspects of virtualization may be visible to volume clients 120, as in the host-based model, while some aspects may be implemented transparently by an intermediate device, as in the switch-based model. Further, in some multilayer embodiments, the virtualization details of one block device (e.g., one volume 180) may be fully defined to a volume client 120 (i.e., without further virtualization at the switch layer), while the virtualization details of another block device (e.g., another volume) may be partially or entirely transparent to volume client 120.

Figure 2:
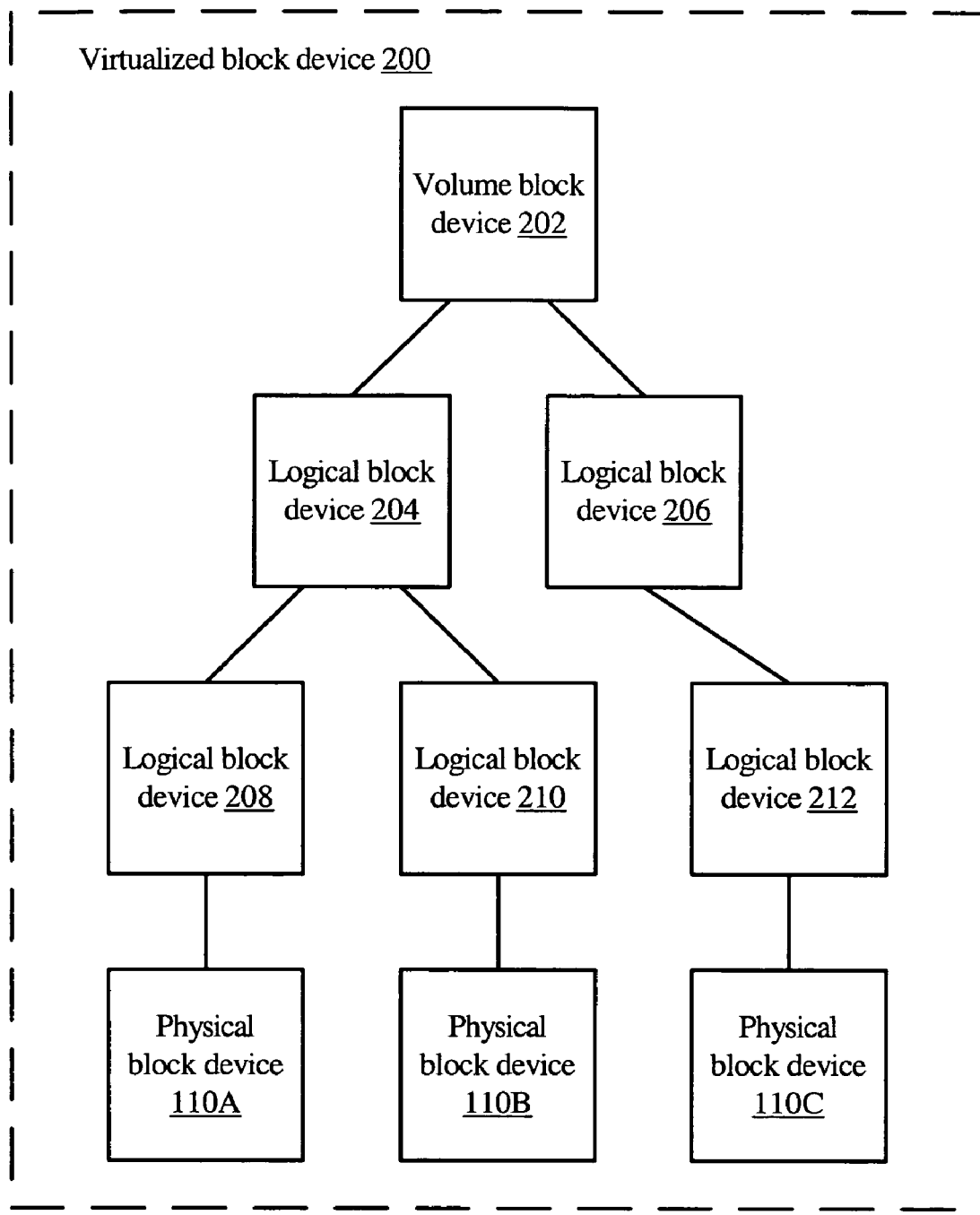
FIG. 2 is a block diagram illustrating one embodiment of a storage system.

One embodiment of a virtualized block device that may be presented to a volume client 120 as a volume 180 is illustrated in FIG. 2. In the illustrated embodiment, virtualized block device 200 includes a volume block device 202 that includes logical block devices 204 and 206. In turn, logical block device 204 includes logical block devices 208 and 210, while logical block device 206 includes logical block device 212. Logical block devices 208, 210, and 212 map to physical block devices 110A, 110B and 110C, respectively.

Virtualized block device 200 may in its entirety represent the structure of the data comprising a given volume 180, which data may be physically stored in physical block devices 110A-C. Volume block device 202 may be configured to be mounted within a file system or presented to an application or other volume consumer as the interface through which the consumer may interact with given volume 180. Each block device that maps to or includes another block device may include an interface whereby the mapping or including block device may interact with the mapped or included device. For example, this interface may be a software interface whereby data and commands for block read and write operations is propagated from lower levels of the virtualization hierarchy to higher levels and vice versa.

Additionally, a given block device may be configured to map the logical block spaces of subordinate block devices into its logical block space in various ways in order to realize a particular virtualization function. For example, in one embodiment, virtualized block device 200 may be configured as a mirrored volume, in which a given data block written to virtualized storage device 200 is duplicated, and each of the multiple copies of the duplicated given data block are stored in respective block devices. In one such embodiment, volume block device 202 may be configured to receive an operation to write a data block from a consumer of corresponding volume 180. Volume block device 202 may duplicate the write operation and issue the write operation to both logical block devices 204 and 206, such that the block is written to both devices. In this context, logical block devices 204 and 206 may be referred to as mirror devices, mirrored plexes, or simply as mirrors. In various embodiments, volume block device 202 may read a given data block stored in duplicate in logical block devices 204 and 206 by issuing a read operation to one mirror device or the other, for example by alternating devices or defaulting to a particular device. Alternatively, volume block device 202 may issue a read operation to multiple mirror devices and accept results from the fastest responder.

As described above and shown in FIG. 2, in some embodiments a virtualized block device 200 may employ multiple layers of virtualization. For example, in the embodiment described above where logical block devices 204 and 206 function as mirror devices, it may be the case that underlying physical block devices 110A-C have dissimilar performance characteristics; specifically, devices 110A-B may be slower than device 110C.

In order to balance the performance of the mirror devices, in one embodiment, logical block device 204 may be implemented as a striped device in which data is distributed between logical block devices 208 and 210. For example, even- and odd-numbered blocks of logical block device 204 may be mapped to logical block devices 208 and 210 respectively, each of which may be configured to map in turn to all or some portion of physical block devices 110A-B respectively. In such an embodiment, block read/write throughput may be increased over a non-striped configuration, as logical block device 204 may be able to read or write two blocks concurrently instead of one. Numerous striping arrangements involving various distributions of blocks to logical block devices are possible and contemplated; such arrangements may be chosen to optimize for various data usage patterns such as predominantly sequential or random usage patterns.

In another aspect illustrating multiple layers of block virtualization, in one embodiment physical block device 110C may employ a different block size than logical block device 206. In such an embodiment, logical block device 212 may be configured to translate between the two physical block sizes and to map the logical block space define by logical block device 206 to the physical block space defined by physical block device 110C. In some instances, the logical block space of logical block device 212 need not be contiguously mapped to blocks of physical block device 110C; an arbitrary mapping may be used.

Numerous other possible configurations of block devices are contemplated that may incorporate more or fewer layers of virtualization to realize within a given instance of virtualized block device 200 virtualization functions similar to or different from those described above. For example, volume block device 202 may employ a greater number of mirror devices, striping may occur higher in the hierarchy than mirroring, certain logical block devices may be configured to perform snapshots of other devices, certain logical block devices may span multiple physical block devices, etc.

In one embodiment, volume server 130 may be configured to read and update configuration information corresponding to volume descriptions (such as a storage object tree corresponding to a given volume) from a configuration database. The configuration information in the database may establish the logical configuration of data on the physical storage devices 110 (e.g., block devices 110A-C). For example, such configuration information may indicate how various logical and physical block devices are divided, striped, mirrored, etc. In one embodiment, the configuration information may be stored on the devices (e.g., block devices 110A-C) that are being virtualized. It is contemplated that in some embodiments, configuration of a given virtualized block device may be managed and/or stored in data structures other than trees of objects. For example, in one embodiment, tables may be used to map virtual block devices to physical storage.

Figure 3:
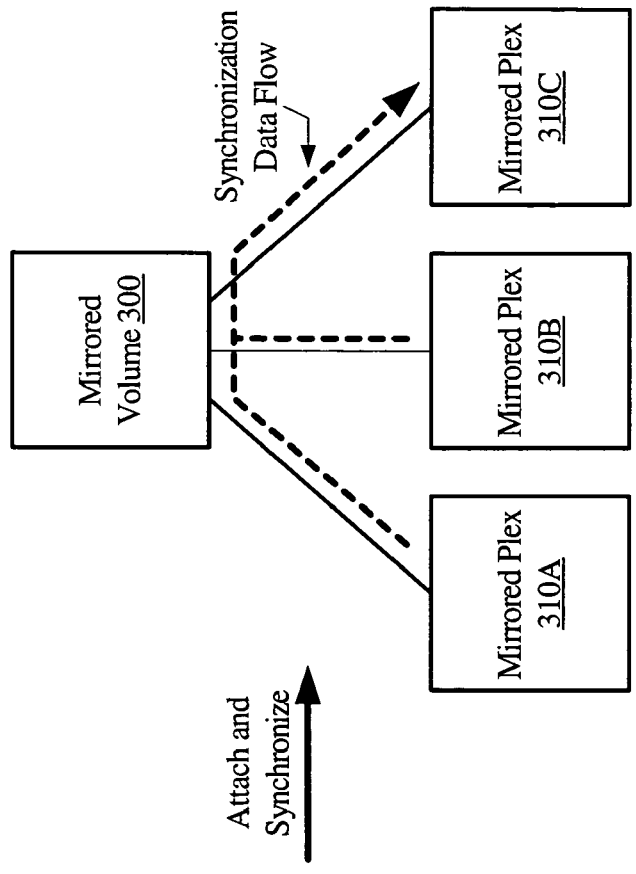
FIG. 3 is a block diagram illustrating a plex attach at a mirrored volume according to one embodiment.
Figure 3:
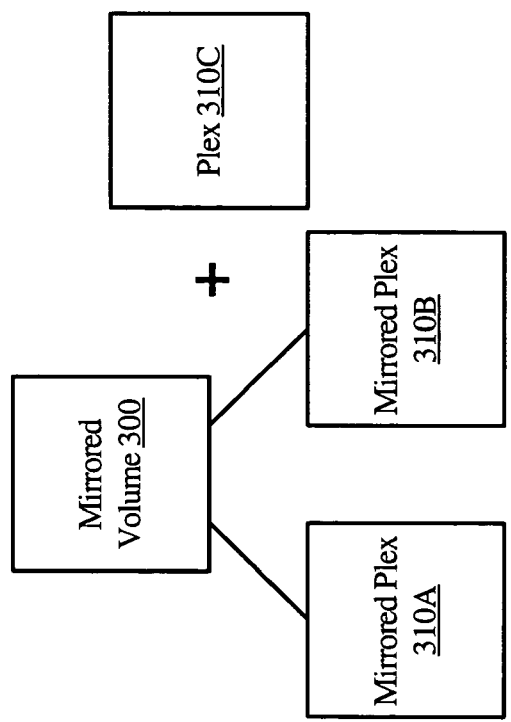

As noted above, the configuration associated with a virtual block device may change over time, such as to add or remove mirrors; migrate data to new storage; increase or decrease the size of the device; create, manipulate, or remove snapshots; add structure for a new capability; etc. An example of such a configuration change is shown in FIG. 3, a block diagram illustrating a plex attach at a mirrored volume in one embodiment. As shown, a mirrored logical volume 300 may initially consist of two mirrored plexes 310A and 310B. An additional plex (310C) may be attached to mirrored volume 300 to form a third mirrored plex, for example to increase the availability of volume 300. Third plex 310C may be synchronized with the first two mirrors 310A and 310B; that is, after plex 310C is attached to volume 300, data may be read from the first and/or second mirrored plexes and replicated at the third mirror during a synchronization phase, until all three mirrors are made consistent and the synchronization phase ends. During such a synchronization phase, normal read and write operations in response to volume client requests may continue at volume 300 in some embodiments. If a replica of the data contained within volume 300 is desired, data may be copied from any of the three mirrors subsequent to the synchronization phase. It may also be possible to convert an existing unmirrored volume into a mirrored volume by adding one or more plexes and synchronizing the data of the existing volume to the newly attached plexes. A technique that employs mirrored plexes to achieve replication at a secondary data site is described in more detail below.

In some embodiments, if the volume description of a given volume 180 is distributed to more than one volume client 120, any changes that affect the structure of the given volume 180 may need to be coherently coordinated among the relevant volume clients 120. In one embodiment volume server 130 may be configured to coordinate such changes. For example, volume server 130 may be configured to coordinate quiescence of those volume clients 120 to which the given volume 180 is distributed, in order to temporarily suspend activity to given volume 180. Volume server 130 may further distribute changes to the structure of given volume 180 to relevant volume clients 120 in an effectively atomic fashion, such that either all or none of the relevant clients 120 receive the changes.

In some embodiments, volume server 130 may be configured to distribute all defined volumes 180 to each volume client 120 present within a system. Such embodiments may be referred to as symmetric distributed block virtualization systems. In other embodiments, specific volumes may be distributed only to respective volume clients 120, such that at least one volume 180 is not common to two volume clients 120. Such embodiments may be referred to as asymmetric distributed block virtualization systems.

In a distributed block virtualization system as described above, replication manager 140 may transfer both data and configuration information for volume 180 from primary storage system 101 to replica storage system 102 over replication link 144. Volume configuration information may be replicated at a replica configuration database at replica storage system 102, corresponding to the configuration database described earlier used by volume manager 130. Volume server 135 may be configured to distribute replica volume 185 to applications requiring access to data, initially stored on block devices 110A-C, that may have been replicated at block devices 110D-E. For example, in the event of a service disruption at primary storage system 101, volume server 135 may be notified of the disruption by replication manager 140, and may make replica volume 185 accessible to any original volume clients (such as 120A-B) that may continue to require access to the volume data subsequent to the service disruption. In some embodiments, volume server 135 may be configured to provide access to replica volume 185 even in the absence of a service disruption at primary storage system 101. For example, a data mining or reporting application, e.g. at volume client 120C or 120D, may perform read operations on the data stored in replica volume 185 while storage system 101 remains functional. Such a read-only application may access replica volume 185 even in the presence of concurrent replication write operations at block devices 110D-E in some embodiments.

Different levels of disaster recovery functionality may be desired for different sets of data within a distributed block virtualization system. For example, in one embodiment, storage within block devices 110A-C may be aggregated into a plurality of volumes, 180A-180N, at primary storage system 101. A mission-critical database management system may utilize a first subset of logical volumes, for example volume 180A for internal database metadata, volumes 180B for user tables, volume 180C for indexes on user tables, and volumes 180D and 180E for various database logs. In contrast, a volume 180K may be utilized to provide temporary workspaces for users of primary storage system 101. In such an environment, rapid disaster recovery may be desired for the volumes (180A-E) used by the mission-critical database management system, while the speed at which recovery of data within temporary workspace volume 180K is accomplished may be of relatively lower importance. Thus, for example, it may be sufficient to perform periodic tape backups for data stored on volume 180K, while recovery manager 140 may be utilized to support rapid disaster recovery of critical database management volumes 180A-E.

In selecting the level of disaster recovery desired for a given set of volumes in a multi-volume environment as described above, two different objectives may need to be considered for the volumes. The first objective may be termed a "recovery point" objective: that is, a point of time in the past up to which a consistent copy of application data stored in the volumes must be recovered in the event of a service disruption or disaster. For example, for volumes containing mission-critical data, such as volumes 180A-E, it may be desired that the recovery point be no more than few minutes; e.g., if a service disruption occurred at primary storage system 101 at noon on a particular date, it may be desired that replica storage system 101 contain a copy of volumes 180A-E that reflects the data of volumes 180A-E as of 11:50 AM on that day. Such a recovery point requirement, if implemented successfully, may still result in a loss of data for transactions that may have completed in the ten minutes immediately prior to the service disruption; therefore, in general, shorter recovery point intervals may be desired for volume containing mission-critical data. The second objective may be termed a "recovery time" objective: that is, the amount of time elapsed before business functionality is restored after a service disruption. The recovery time objective for volumes 180A-E may also be a few minutes, so that, for example, in the event of a service disruption at noon, it may be desired that the mission-critical database management system functionality be restored by 12:10 PM for new transactions. In contrast with the objectives for volumes 180A-E, the recovery point and recovery time objectives for volumes such as 180K containing less important data may be longer; e.g., it may be acceptable to recover the state of volume 180K as of a day prior to the time of service disruption, and it may be acceptable to restore access to a temporary workspace volume within a few hours rather than a few minutes.

In order to support disaster recovery requirements appropriate for different volumes, in one embodiment replication manager 140 may be configured to allow users to specify a desired set of recovery objectives for a set of one or more volumes. For example, when a system administrator sets up a new volume, the interface (e.g., a command-line tool or graphical user interface) used to create the volume may allow the administrator to specify whether disaster recovery using replication for the new volume is desired, and if it is desired, to select from among a set of available recovery point and recovery time options. Thus a set of volumes distributed by volume server 130 to volume clients 120A-B may include a subset of volumes configured for replication using recovery manager 410, while recovery for the remaining volumes may be managed using tape-based backups or some other technique (and in some cases, one or more volumes may not be configured for any disaster recovery). The volumes configured for replication may include both data volumes (e.g., volume 180B used for database tables) and metadata volumes (for example, volumes containing configuration information on data volumes). In some embodiments, multiple replica storage systems may be employed to provide an even higher level of disaster recovery than that provided by a single replica storage system 102. In such embodiments, a system administrator may also select the specific replica storage system or systems to be used for replication of a given volume 180. Interfaces may also be provided for system administrators to modify the existing disaster recovery objectives (including the selection of replica storage systems used) for a given volume 180 or a set of volumes as desired in some embodiments.

Some applications, such as the mission-critical database management application described above, may impose certain consistency requirements governing the sequence in which a set of write operations on different volumes may be performed at primary storage system 101. For example, in order to preserve the ACID (atomicity, consistency, isolation, and durability) properties required of an online transaction processing system, a write operation may first have to be performed at a database log volume 180D before a corresponding write operation is performed at a volume 180B containing database user tables. Such a strict ordering of writes may be required to allow the database management system to recover from a failure or an aborted transaction to a consistent database state. As described below, replication write operations (i.e., write operations performed on block devices 110D-E to create one or more replica volumes) may be performed asynchronously with respect to write operations at source volumes in some embodiments. In order to be able to provide the required transaction processing functionality from replica storage system 102 (e.g., in the event of loss of service at primary storage system 101), replication manager 140 may be required to ensure that write ordering is preserved during replication. In general, write ordering may require that if a first write request W1 is issued, and an indication of write completion is provided to the requester, then data modified by a second write request W2 (initiated after the completion indication for W1 has been provided) may not be committed (e.g., made persistent by writing to disk) until data modified by W1 has been committed. A requirement to preserve write ordering during replication (i.e., to ensure that the relative order of any two writes W1 and W2 is the same at both primary and replica storage systems) may be known as a "write order fidelity" requirement. In some embodiments, replication manager 140 may support write order fidelity by performing replication write operations at a set of replica volumes in the same sequence in which the corresponding write operations were performed at the respective source volumes. In other embodiments, as described below, a replication manager may support write order fidelity by applying large groups of writes as a unit. In such an embodiment, any two such groups of writes may differ in that the first group may include writes that completed before any writes from the second group. A group of writes that were initiated before all other writes in the first group completed, and were completed after any other writes in the second group were started, could be placed in either the first group or the second group.

Figure 4:
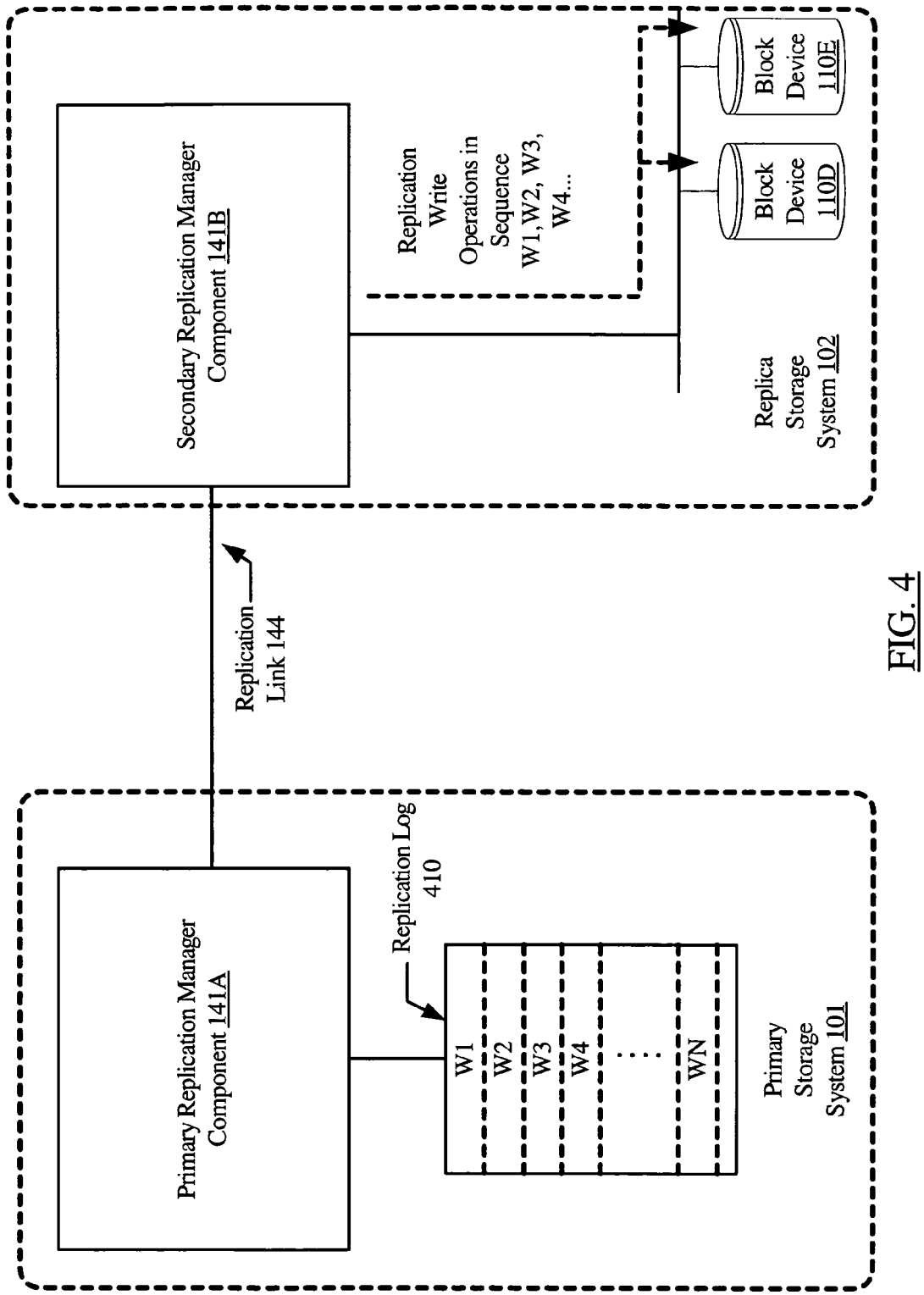
FIG. 4 is a block diagram illustrating one embodiment of a replication manager that utilizes a replication log.

Replication manager 140 may cooperate with volume server 130 and volume clients 120A-B to utilize one or more replication logs 410, as illustrated in FIG. 4 for one embodiment, in order to satisfy write order fidelity. A replication log 410 may be any persistent data object capable of storing a sequence of entries or records, where each entry contains details of a particular data write operation—for example, the address at which a write operation is to be performed, the contents of the data updated, etc. In one embodiment, a replication log 410 may itself be a metadata volume configured for replication. An entry for each data write targeted at a data volume configured for replication may be entered in a replication log 410. In some embodiments, an entry in replication log 410 may include an explicit ordering indicator, such as a sequence number. Entries for database log writes targeted at volume 180D and for user table writes targeted at volume 180B may be created at replication log 410 by primary replication manager component 141A, sequenced by the database management system in the order required for database consistency to be maintained. Data writes at block devices 110A-C for source volumes 180 may then be performed in an appropriate consistency-preserving order. Entries in the replication log may be transmitted to replica storage system 102, either individually or in groups, including ordering indicators for the entries. In some embodiments a secondary replication log may be used to store log entries from replication log 410 received at replica storage system 102. As shown in FIG. 4, entries for write operations W1, W2, W3, . . . WN may be created at replication log 410, and transmitted to secondary replication manager component 141B, which may perform replication write operations in the same sequence (W1, W2, W3, . . . WN) on block devices 110D-E, thus satisfying write order fidelity requirements.

It is noted that concurrent write requests (e.g., where two write requests W1 and W2 are both initiated before either completes) may be committed in any order without violating write order fidelity. In some embodiments, concurrent write requests, or writes initiated in close time proximity, may be batched for replication instead of being replicated one at a time. Batching replication requests may help to reduce data transmission overhead. For example, in one implementation, write requests may be batched into ten-second groups, and replication log entries for write requests received during each successive ten-second period at primary storage system 101 may be sent to replica storage system 102 as a unit. In such an implementation, replication write operations within a given batch may be performed in any order, as long as replication write operations of two different batches are performed in batch order. Each batch may be treated as an "all-or-nothing" transaction, i.e., if any single replication write operation of a batch fails, the entire batch may be considered to have failed, and the entire batch may be resent for replication.

In some embodiments, entries may also be created in replication log 410 for passing control information to secondary replication manager component 141B, in addition to the entries described above for data write operations. Such control information entries may be known as "in-band control" (IBC) entries or IBC messages. For example, a virtualization operation such as a snapshot creation may need to be scheduled at replica storage system 102. It may be desired that the snapshot include data reflecting a specific set of updates performed at primary storage system 101, such as updates reflecting the last stock trades performed on a given business day using a stock trading volume client application. Primary replication manager component 141A may insert an IBC message requesting the snapshot creation into replication log 410 immediately after the last data write entry for the desired set of updates. When secondary replication manager 141B receives the IBC message to create a snapshot, all the updates of the set may have already been replicated at replica storage system 102 (as they preceded the IBC message in replication log 410), and the desired snapshot may therefore be created.

Figure 5:
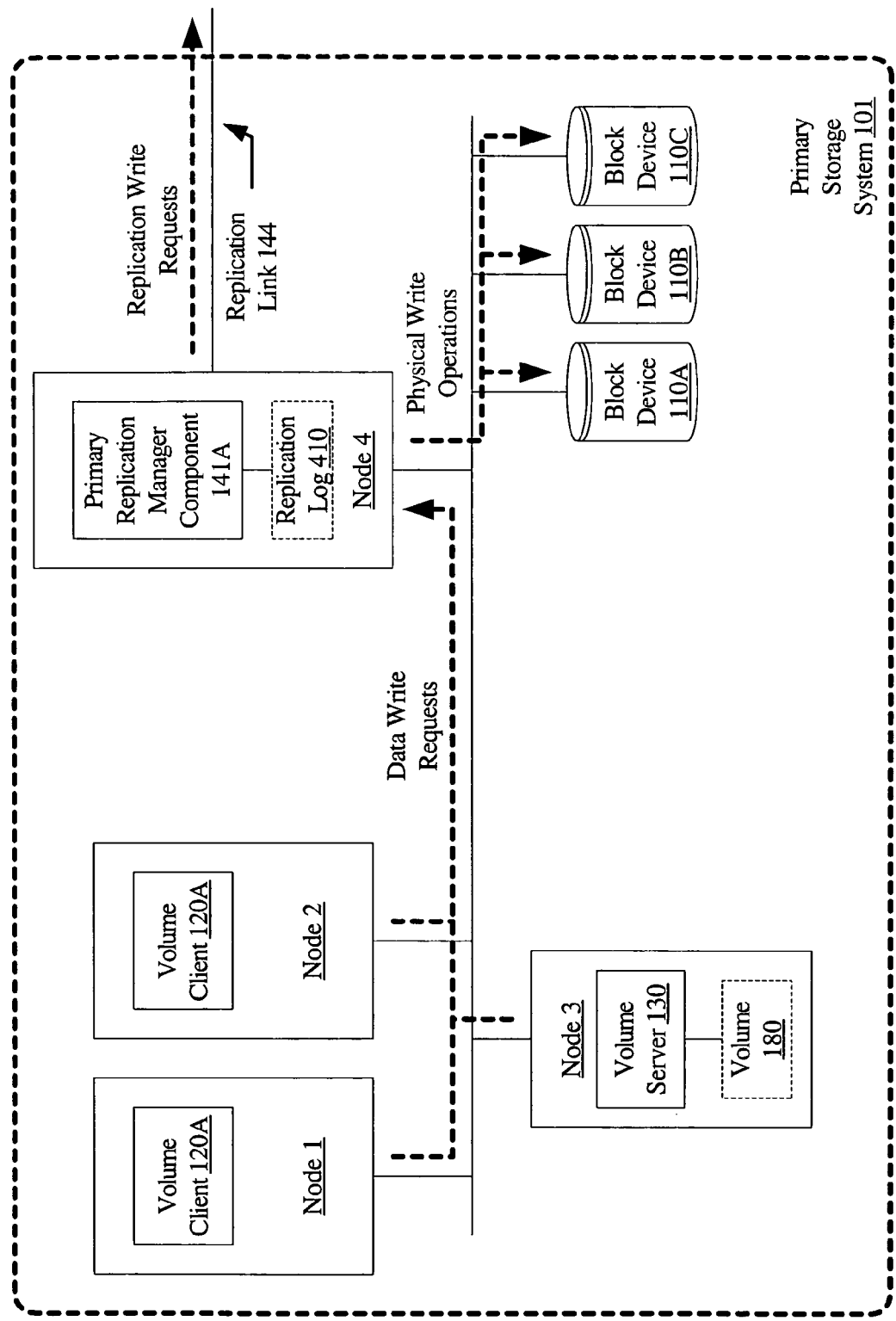
FIG. 5 is a block diagram illustrating one embodiment of a primary storage system including four cluster nodes.

In some embodiments, primary storage system 101 may include two or more nodes forming a cluster. FIG. 5 illustrates one embodiment including four cluster nodes, Nodes 1-4. Volume client 120A may be hosted at Node 1, volume client 120B at Node 2, and volume server 130 at Node 3. In order to satisfy write order fidelity requirements for data writes requested by volume clients 120A-B, a specific node (Node 4 in the illustrated embodiment) may be designated as a log owner node for a given volume 180 or a given set of volumes configured for replication. Primary replication manager component 141A may be configured to maintain replication log or logs 410 at the log owner node, and to direct all data write requests from the nodes of the cluster to the log owner node. Thus, write requests directed at volume 180 may be combined into a single write sequence at the log owner node, and transmitted to secondary replication manager 141B to allow replication write operations to be performed in an order preserving write order fidelity. Instead of transferring write requests itself, in some embodiments primary replication manager component 141 may cooperate with volume clients 120A-B or volume server 130 to perform the transfer: for example, primary replication manager 141 may provide sequence numbers (e.g., corresponding to a sequence in which write requests were logged) for write operations to volume clients 120 A-B, and the volume clients may transfer the data to replica storage system 102.

In some embodiments, multiple sets of volumes may be configured for replication, and a different log owner node may be selected for each set of replicated volumes. For example, one log owner may be selected for volumes 180A-E, and another for volumes 180F-H. In a storage environment with frequent updates to different volumes, such a distribution of log owner responsibilities may allow replication load to be balanced across nodes. A single node may also be configured as the log owner node for multiple volume sets in some embodiments. Furthermore, a log owner node may also host a volume server (such as volume server 130) and/or one or more volume clients. In some embodiments, replica storage system 102 may also include two or more nodes configured as a cluster. A single node at replica storage system 102 may be specified as a log receiver node for a given set of replicated volumes in such an embodiment; thus, log entries for a given set of replicated volumes may be consolidated at a log owner node at the primary storage system, and transmitted for replication to a corresponding log receiver node at the replica storage system. Various failover policies may be used to transfer log owner and/or log receiver responsibilities from one node to another in the event of a failure. For example, in one embodiment, in the event of a failure at a log owner node such as Node 4 of FIG. 5, the least loaded remaining node at storage system 101 may be selected based on a specific set of criteria as a new log owner node. In some clustered embodiments, copies of a part of replication log 410 (e.g., log metadata maintained in a log header) may be distributed periodically to one or more nodes other than the current log owner node, in order to facilitate a quick takeover of log owner functionality at another node if the log owner node fails.

As described above, multiple write operations and message transmissions may be required in response to a given data write request from a volume client 120A. For example, a data write request from volume client 120A at Node 1 of FIG. 5 directed at volume 180 may eventually result in the following operations in one embodiment: (1) a message containing the data write request from volume client 120A at Node 1 to primary replication manager component 141A at log owner Node 4; (2) an update to replication log 410 (which may require a physical write operation at a block device similar to 110A); (3) a local physical write operation at a block device 110A, 110B or 110C; (4) a message requesting replication sent over replication link 144 to secondary replication manager component 141B from primary replication manager component 141A; (5) a local physical write at a block device 110D or 110E; (6) a message indicating replication completion sent over replication link 144 to primary replication manager component 141A from secondary replication manager component 141B; and (7) a message indicating completion of the data write request sent to volume client 120A at Node 1 from primary replication manager component 141A at Node 4. In some embodiments, where for example volume 180 and/or replica volume 185 may be configured as a mirrored volume including multiple plexes, addition physical write operations may also be required beyond those listed above (e.g., a physical write may be performed at each mirror). In order to reduce the latency for data write operations as seen at the requesting volume client, replication manager 140 may be configured to perform replication for data writes asynchronously, as described below.

Figure 6:
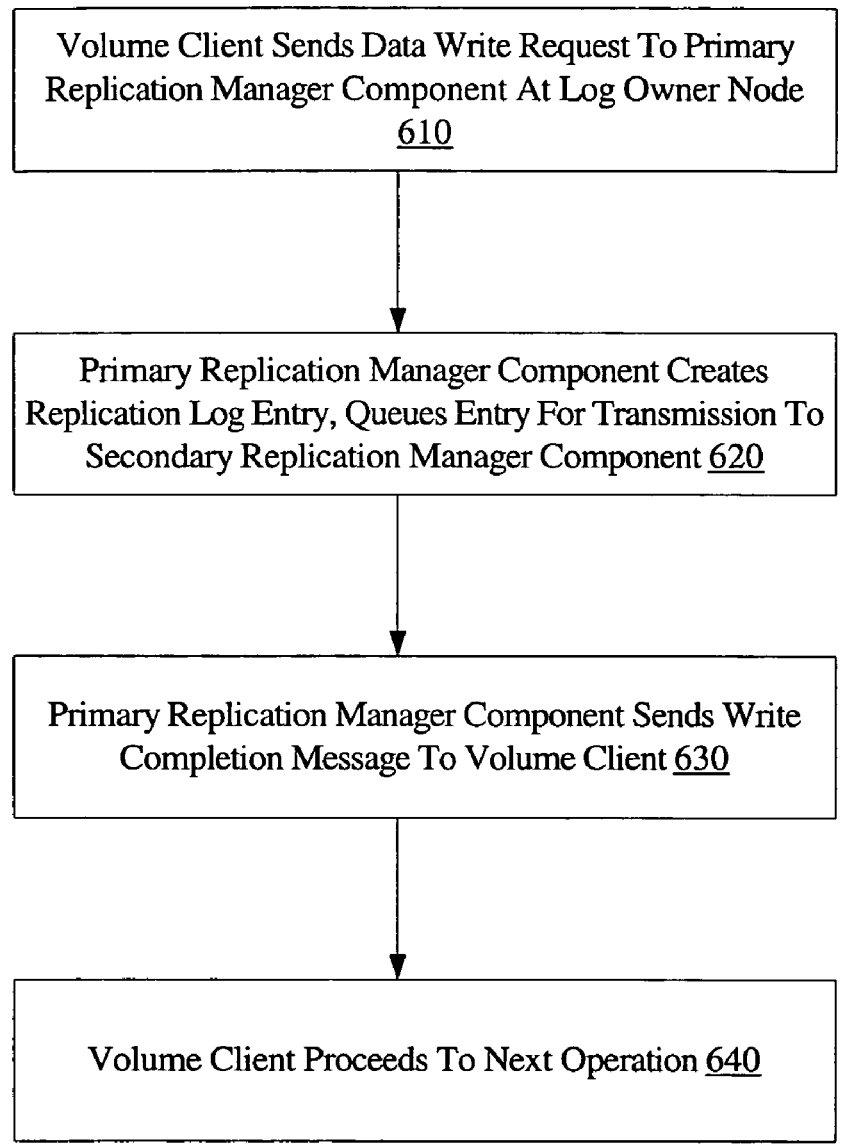
FIG. 6 is a flow chart illustrating aspects of the operation of an embodiment employing asynchronous replication.

FIG. 6 is a flow chart illustrating aspects of the operation of an embodiment employing asynchronous replication. As shown in block 610, a volume client such as 120A at Node 1 may send a data write request for a volume 180 to primary replication manager component 141A at log owner Node 4. Primary replication manager component 141A may create an entry for the data write request in replication log 410 (block 620) and place a corresponding entry for a replication operation in a queue for asynchronous transmission to secondary replication manager component 141B. After the request has been queued, primary replication manager component 141A may send a message indicating a successful write completion to volume client 120A (block 630), and volume client 120A may proceed to a next operation (block 640). In this way, the latency seen at volume client 120A for a data write request may be limited to the sum of the latencies of two messages over network 160 and a write operation to replication log 410. The remaining messages and operations listed above, such as the messages over replication link 144 and the physical write operations at block devices 110A-C and 110D-E, may all be performed asynchronously with respect to the data write request issued by volume client 120A. In some embodiments, for example, asynchronous threads within primary replication manager component 141A may be responsible for sending queued replication entries to secondary replication manager component 141B and for performing local physical writes at block devices 110A-C. Similarly, asynchronous threads at secondary replication manager component 141B may be configured to perform the required physical write operations at block devices 110D-E. Write order fidelity requirements may be satisfied at both primary and replica storage systems, as write operations are performed in the order of replication log entries at both storage systems.

In an embodiment employing asynchronous replication, a volume client 120 may be notified of a successful completion of a data write operation before the corresponding physical data block is updated at an underlying block device 110.

Therefore, a mechanism to prevent reads of unwritten data may be required. Replication manager 140 may use a locking mechanism to prevent such reads. For example, in one embodiment a cluster-wide lock may be obtained on the data block targeted by the data write operation, and such a cluster-wide lock may not be released until the physical write operation or operations are completed. An application requesting a read of the data block from any node of the cluster may have to wait until the lock is released before being allowed to access the data.

As described previously, primary storage system 101 may be located at a primary data center geographically distant from a secondary data center containing replica storage system 102. Replication link 144 may therefore be required to transfer data across long distances in order to support the replication of volume 180. Thus, replication link 144 may, in one embodiment, be part of a Wide Area Network (WAN), which may be defined as a communication network that may extend across buildings on a campus, across multiple campuses in one or more cities, across a country, or across different continents. In some embodiments, replication link 144 may be a dedicated and/or persistent connection set up specifically for replication and disaster recovery by replication manager 140. Such a dedicated link may utilize any appropriate technology or combination of technologies, such as various implementations of optical fiber networks, copper-based connections, satellite transmissions, microwave links and the like and may include several constituent physical links connected by bridges, routers, hubs, repeaters etc. Various communication protocols may be employed for transferring data over replication link 144, such as Internet Protocol (IP), User Datagram Protocol (UDP), Transmission Control Protocol (TCP), Asynchronous Transfer Mode (ATM), etc. In other embodiments, data required for replication at secondary storage system 102 may be transferred over an Internet connection or another more transient connection using any appropriate Internet protocol, and replication link 144 may be a virtual link which may map to a different set of physical links at different points in time.

As a result of the geographical separation of primary storage system 101 and replica storage system 102, the speed at which data required for replication may be transferred over replication link 144 may be slow, especially in comparison to the speeds at which data may be transferred within a given storage system (e.g., using network 160 at primary storage center 101). For example, in one embodiment network 160 may have a peak network bandwidth of several gigabits per second (e.g., utilizing multiple gigabit Ethernets), while replication link 144 may be limited to a peak effective bandwidth of several megabits per second by a relatively slow constituent physical link.

The transmission of data from primary storage system 101 to replica storage system 102 may also require processing resources at both storage systems, which may interfere with concurrent normal application processing (i.e., processing unrelated to replication). Excessive contention for processing resources between replication manager 140 and other applications unrelated to replication at primary storage system 101 (and at replica storage system 102) may result in degraded performance for the other applications. A replication technique that uses mirror synchronization to reduce resource contention between replication manager 140 and other applications at primary storage site 101 may be employed in some embodiments, as described below. It is noted that within a given distributed block virtualization environment, a combination of replication techniques may be used: for example, in one embodiment, the technique described earlier employing a replication log and a log owner node may be employed to replicate one set of volumes, while the mirror synchronization technique described below may be used to replicate another set of volumes.

Figure 7A:
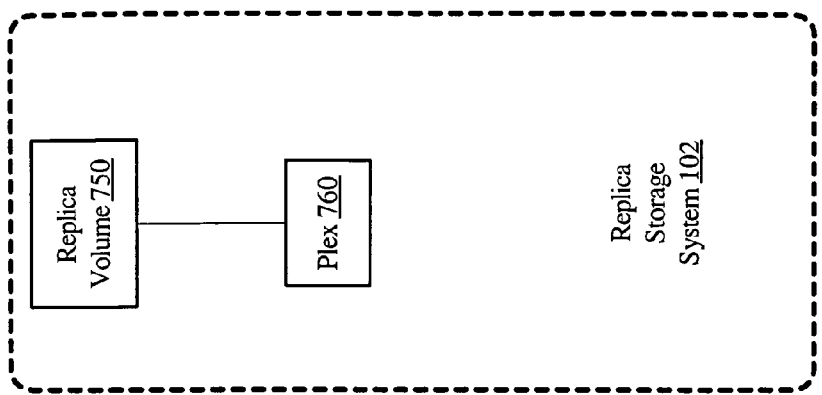
FIGS. 7a-7g are block diagrams that collectively illustrate aspects of the operation of one embodiment where the data of a mirrored volume is replicated at the replica storage system of FIG. 1.
Figure 7A:
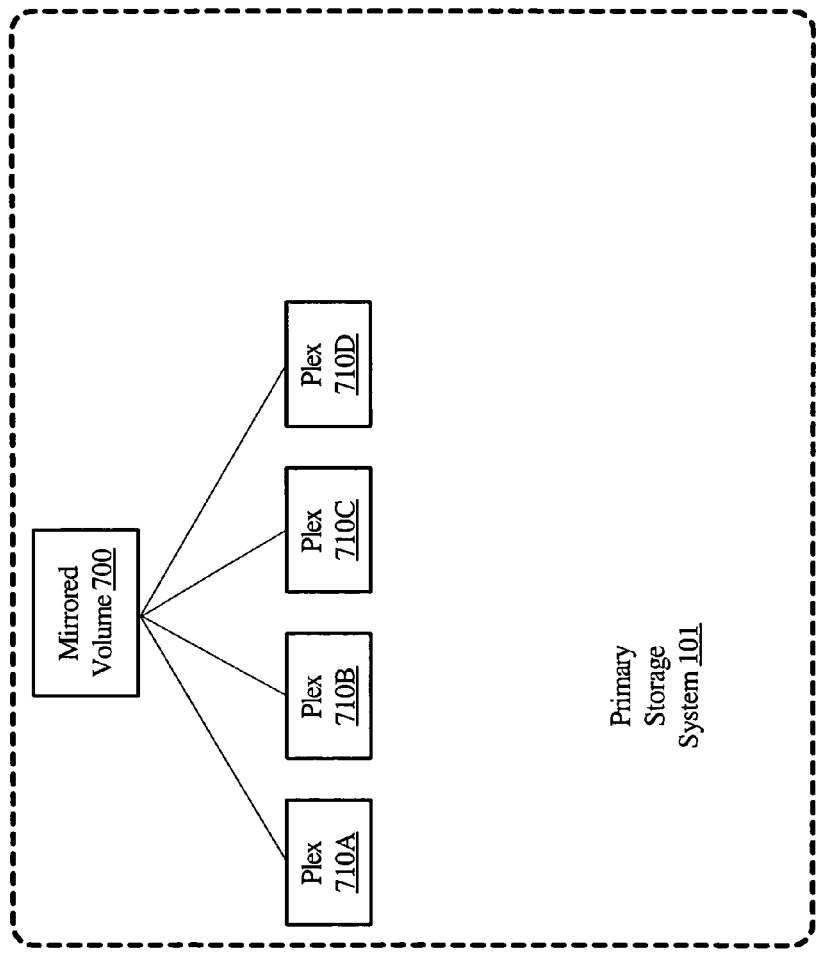

FIGS. 7a-7g are block diagrams that collectively illustrate aspects of the operation of one embodiment where the data of a mirrored volume is replicated at replica storage system 102. FIG. 7a shows a mirrored logical volume 700 configured to include four mirrored plexes 710A-D at primary storage system 101. As described earlier, it may be possible to configure a given volume requiring replication (e.g., volume 180 of FIG. 1) as a mirrored volume (such as volume 700) within a distributed block virtualization environment by adding and synchronizing a desired number of plexes. A replica volume 750 may be set up at replica storage system 102 to replicate the data of volume 700, including a single, initially empty, plex 760. Mirrored plexes 710A-D may each contain a complete copy of data for volume 700. Thus, in order to replicate the data of volume 700, any one of plexes 710A-D may be used as a source for replication.

Figure 7B:
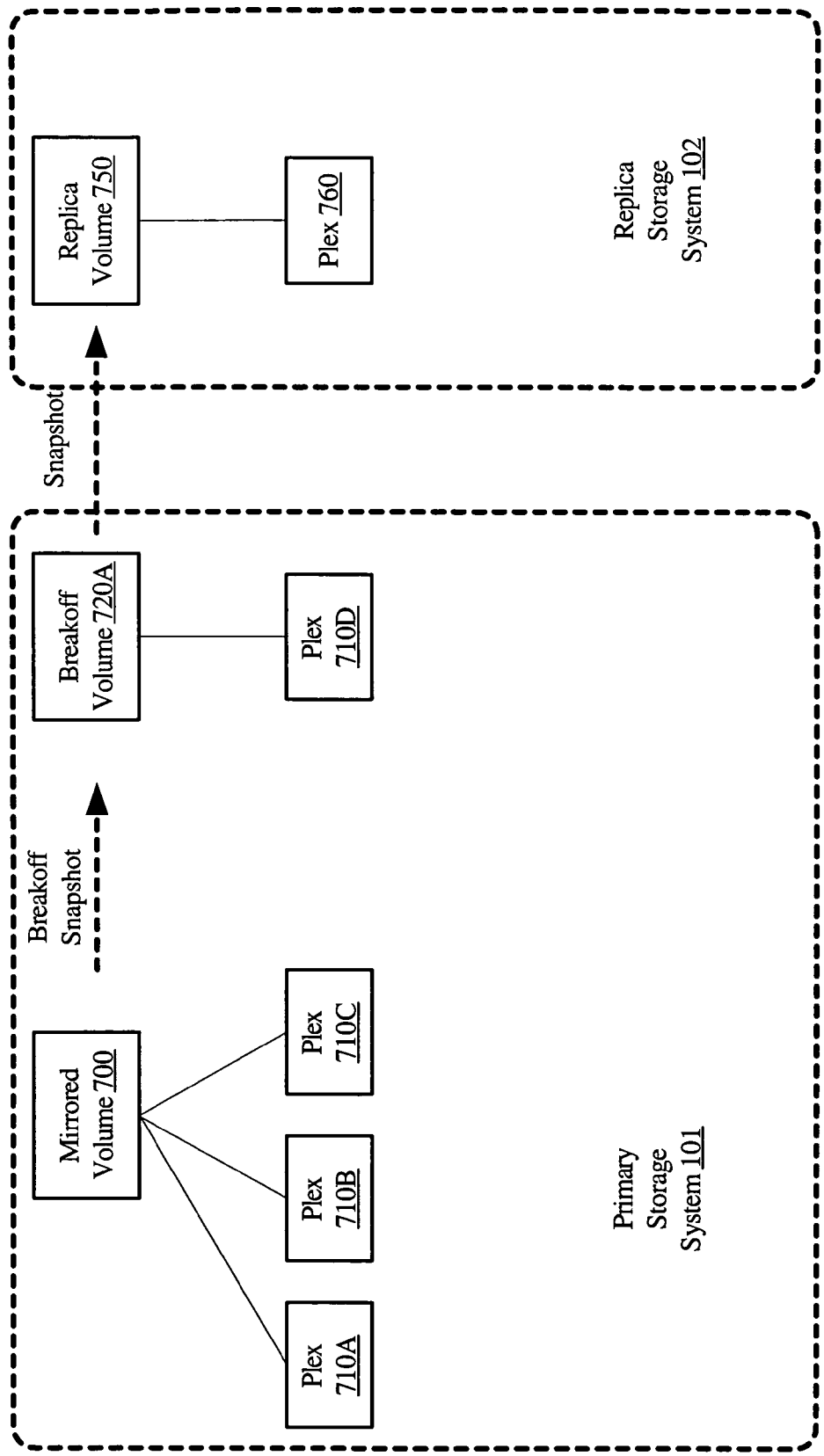

FIG. 7b illustrates the creation of a "breakoff" volume 720A that includes plex 710D from volume 700, and a snapshot operation to replicate the contents of breakoff volume 720A at replica volume 760. A "breakoff snapshot" operation may be performed on mirrored volume 710D by replication manager 140 to create breakoff volume 720A: that is, mirror 710D may be broken off (i.e., removed) from volume 700 and included within a newly created volume 720A. Breakoff volume 720A may thus contain a copy or snapshot of the data of volume 700 as of the time the breakoff snapshot operation was performed. Volume clients (e.g., 120A and 120B) may continue to perform updates on volume 700 after the breakoff snapshot operation as part of normal operation, and the performance of such update operations on volume 700 may be unaffected or very minimally affected by the creation of breakoff volume 720A. As shown in FIG. 7b, after the creation of breakoff volume 720A, a snapshot operation may be performed by replication manager 140 to duplicate the data of breakoff volume 720A at replica volume 750. As stated earlier, plex 760 may be initially empty, so a complete copy of the data contained within breakoff volume 720A may be performed over replication link 144 at the stage of operation illustrated in FIG. 7b. The breakoff snapshot may isolate the replication data traffic (i.e., transfer of data from plex 710D over replication link 144) from the traffic for ongoing updates on volume 700 being performed by volume client applications as part of normal operation, thus reducing the impact of replication on the normal services provided by primary storage system 101. In addition, breakoff volume 720A may be hosted at a different computer host or at a different cluster node than volume 700 in some embodiments, thereby also reducing contention for processing resources between normal operations and replication-related operations.

Figure 7C:
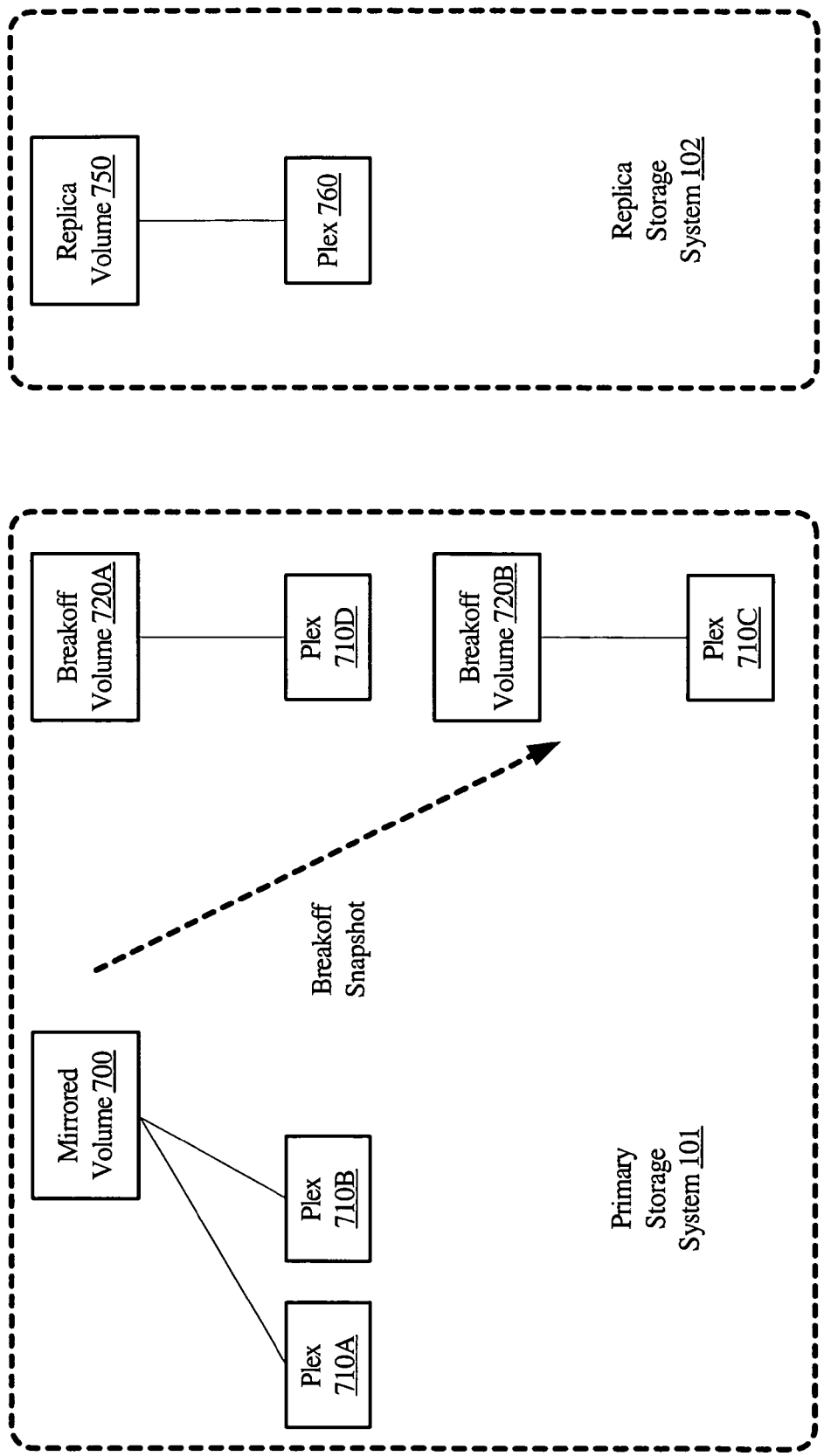

Once the snapshot operation copying data from breakoff volume 720A to replica volume 750 is complete, replica volume 750 may contain a copy of the data of volume 700 as of the time plex 710D was broken off from volume 700. However, during the time taken to synchronize replica volume 750, the data contained in breakoff volume 720A may have become out-of-date with respect to the data of volume 700 due to updates performed by volume clients at volume 700. Thus there may be a newly updated subset of data contained within each of the three plexes 710A-C of volume 700 that may not have been replicated at replica volume 750. In order to replicate this newly updated data, replication manager 140 may perform another breakoff snapshot operation, creating breakoff volume 720B including plex 710C, as illustrated in FIG. 7c. Data contained within breakoff volume 720B may thus reflect the new updates performed at volume 700 between the time plex 710D was earlier broken off (FIG. 7b) and the time that plex 710C was broken off.

Figure 7D:
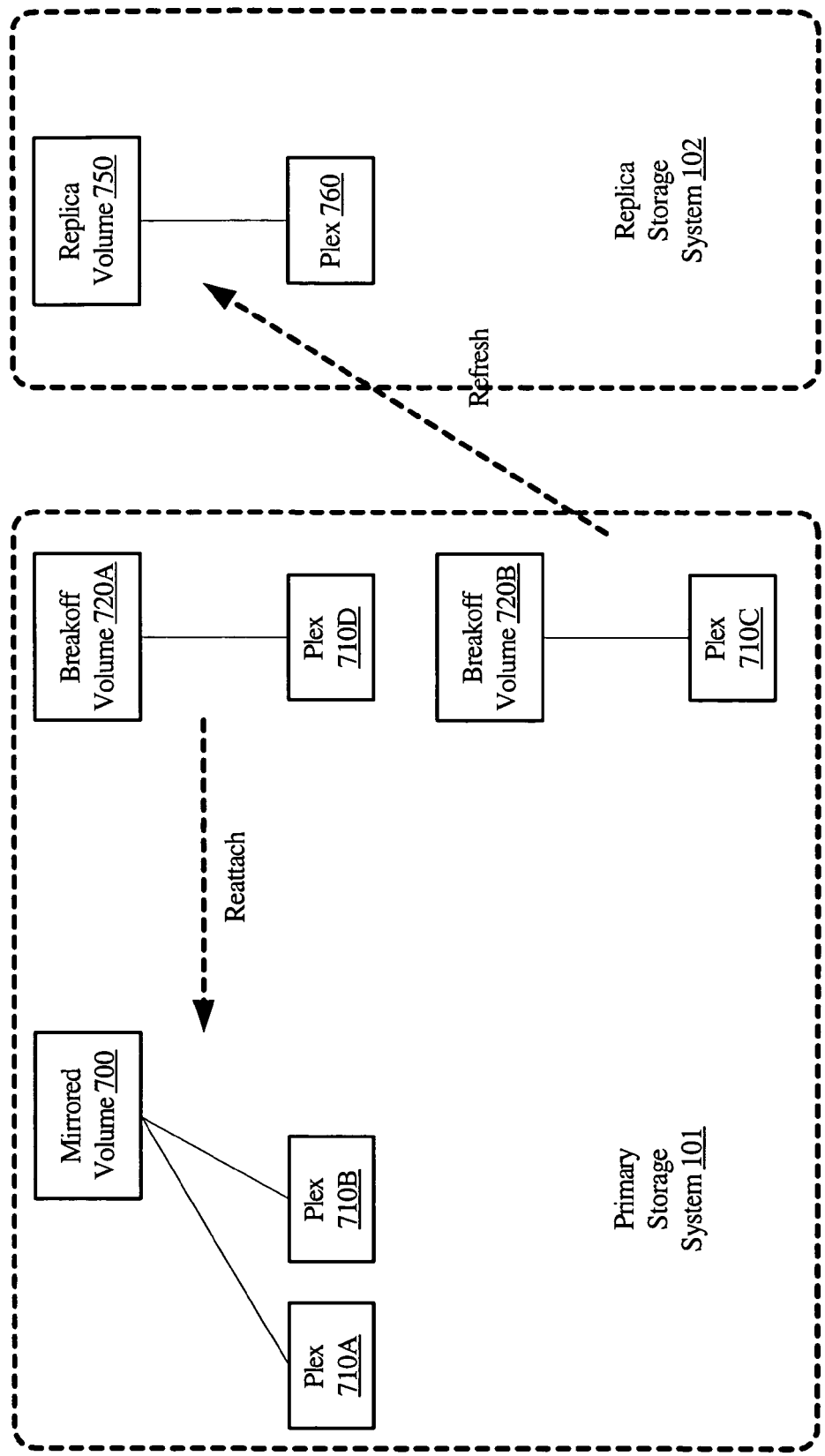

FIG. 7d illustrates the next steps of the replication process: a "refresh snapshot" operation performed on volume 750 using breakoff volume 720B, and a reattach of plex 710D to volume 700. Replication manager 140 may perform a refresh snapshot operation to copy the newly updated data (i.e., data updated at volume 700 between the breakoff snapshots of FIG. 7b and FIG. 7c) to replica volume 750 over replication link 144. A refresh snapshot operation may be a special snapshot operation optimized to reduce the amount of data copied between a source and target volume that may each have been previously synchronized with a common parent volume (e.g., volume 700). For example, in one embodiment a volume modification map may be used to identify the subset of data updated at parent volume 700 between a specified pair of snapshot operations (e.g., the breakoff snapshot to create volume 720A in FIG. 7b, and the breakoff snapshot to create volume 720B in FIG. 7c). The map may be used to select an appropriate subset of data to copy from volume 720B to volume 750 during the snapshot refresh operation, instead of copying all of the data of volume 720B. As with the initial snapshot operation performed to replicate volume 720A at volume 750, network traffic and processing for the refresh snapshot operation may be isolated from traffic and processing for normal operations performed using volume 700, thereby reducing any impact of replication operations on normal operations. While the snapshot refresh operation is performed, replication manager 140 may also reattach plex 710D to volume 700, as shown in FIG. 7d.

Figure 7E:
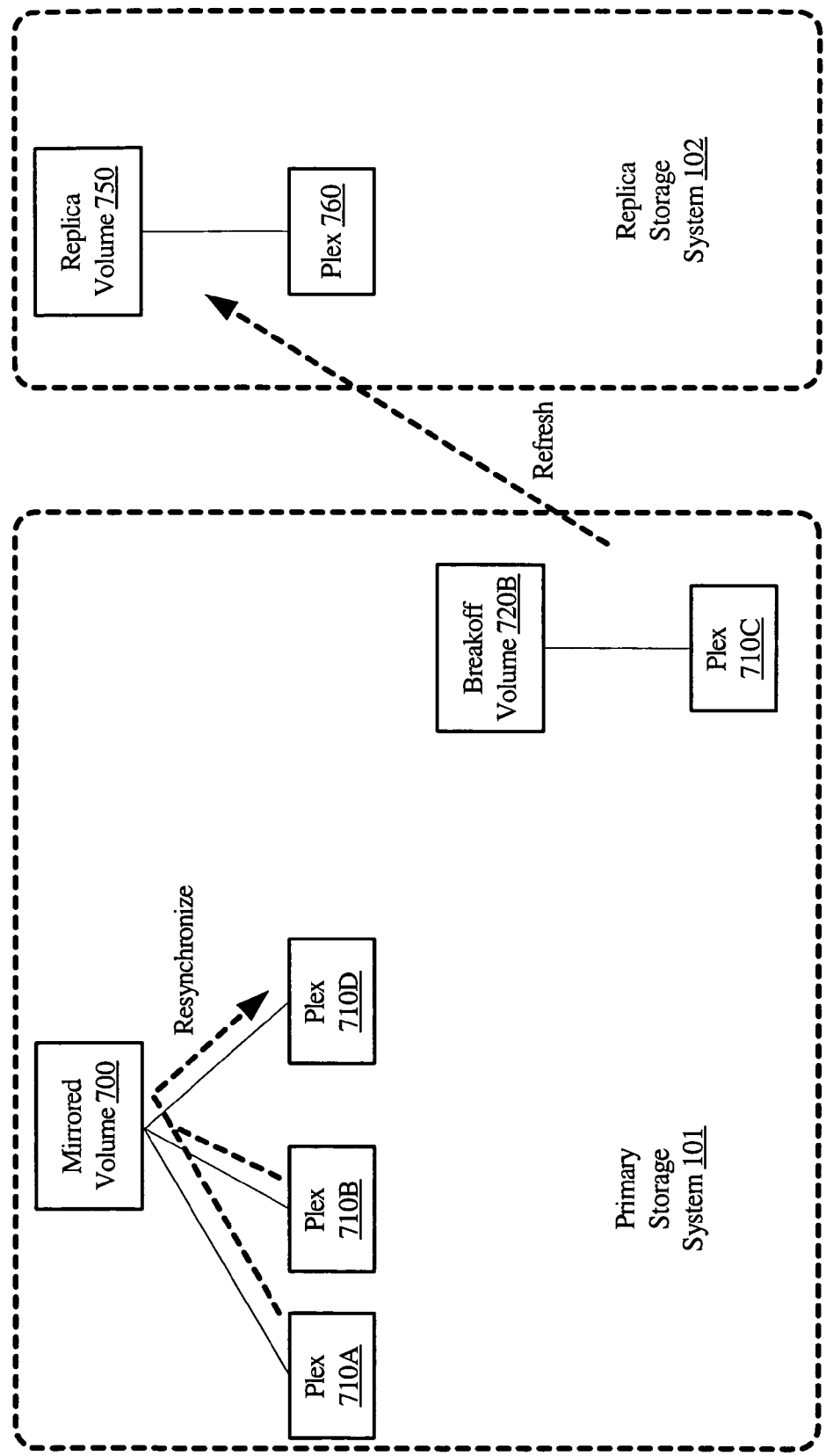

As shown in FIG. 7e, once plex 710D is reattached, it may be resynchronized with the remaining plexes (710A and B) of volume 700. The resynchronization may also be optimized (in a manner similar to the refresh snapshot optimization described above) to ensure that only the data updated at volume 700 in the period following the earlier breakoff of plex 710D is copied to the newly reattached plex. During mirror resynchronization, normal I/O operations may continue at volume 700 on behalf of volume clients 120A-B. By reducing the amount of data copied, the impact of the mirror reattach on concurrent I/O operations may also be reduced. At the end of the mirror resynchronization operation, plexes 710A, 710B and 710D may once again be consistent with one another. At the end of the refresh snapshot, replica volume 750 may be up-to-date with volume 700 as of the time when plex 710C was broken off. However, updates performed at volume 700 after the breakoff of plex 710c may not yet be reflected at replica volume 750.

Figure 7F:
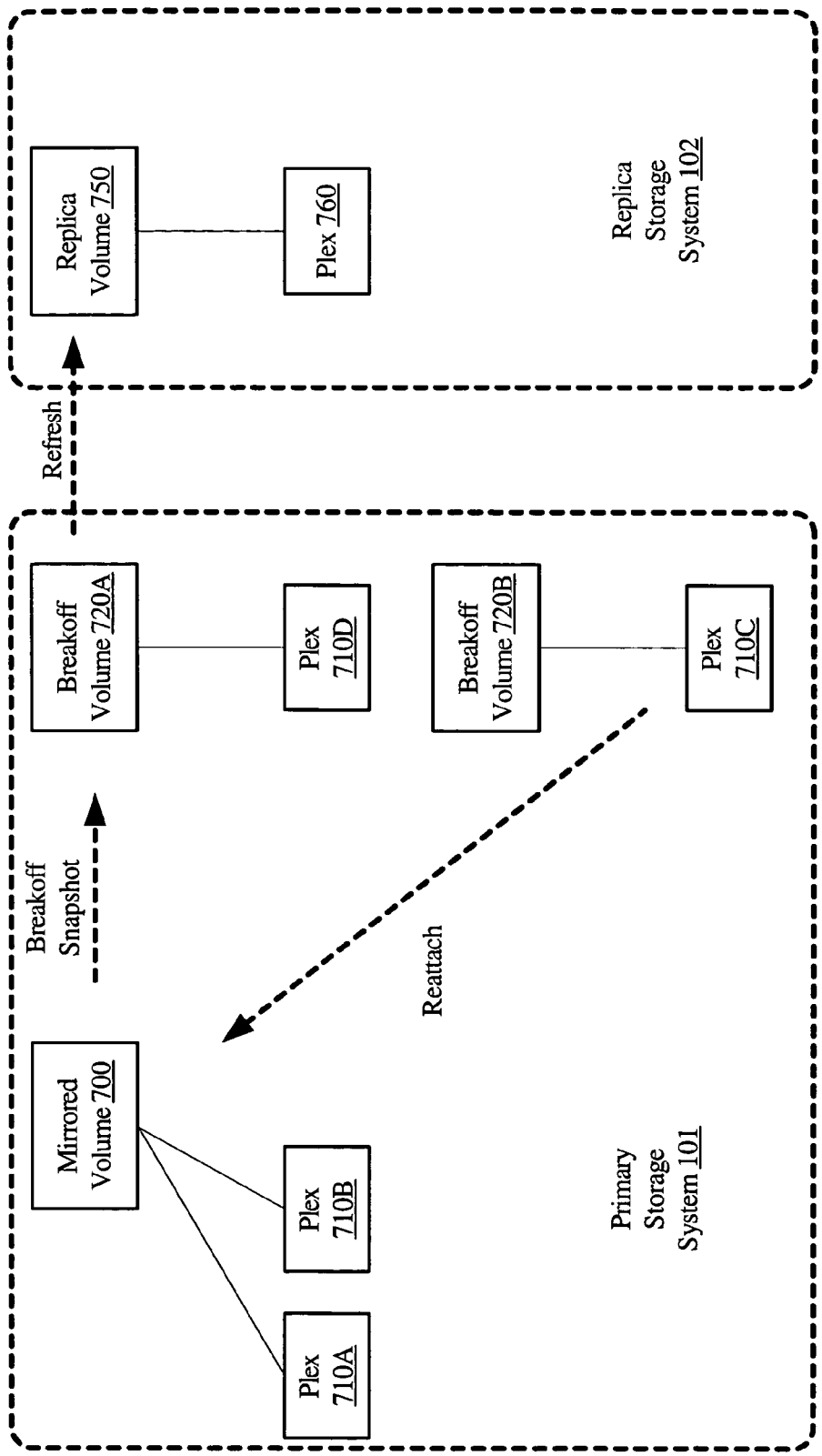
Figure 7G:
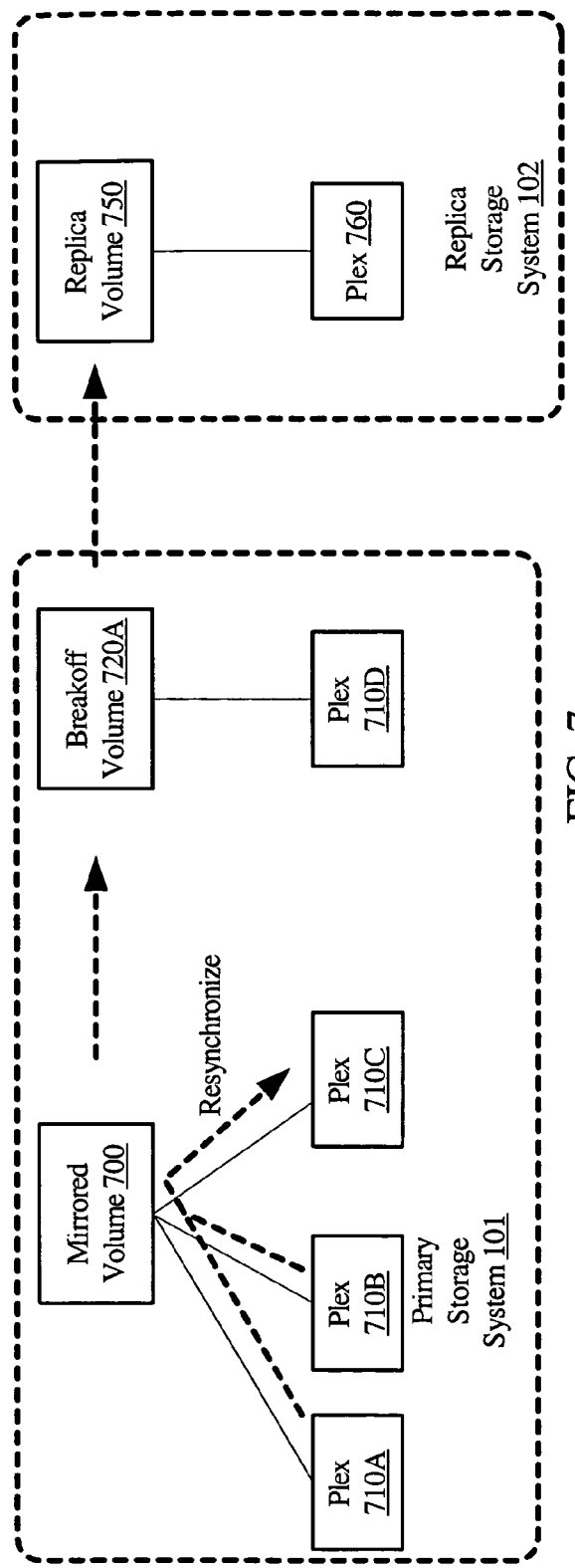

FIG. 7f illustrates the next steps that may be taken by replication manager 140 to replicate recently updated data at replica volume 750. As shown, plex 710D may once again be broken off from volume 700 to form breakoff volume 720A, and a second refresh snapshot operation may be performed to synchronize the data of breakoff volume 720A to replica volume 750. Meanwhile, just as plex 710C was earlier reattached to volume 700, plex 710C may now be reattached to volume 700. The second refresh snapshot operation may replicate data at replica volume 750 that was updated between the time that plex 710C was broken off (FIG. 7c) and the time of the second breakoff of plex 710D.

Figure 8:
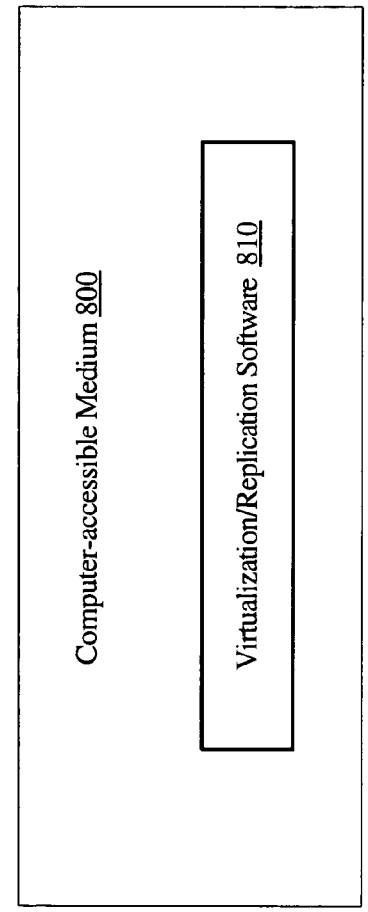
FIG. 8 is a block diagram illustrating a computer-accessible medium.

Once reattached, plex 710C may be resynchronized with plexes 710A and 710B as shown in FIG. 8, using an optimized mirror resynchronization technique as described earlier for the resynchronization of plex 710D. At the end of the resynchronization, plexes 710A, 710B, and 710C may be up-to-date with the latest updates of volume 700, just as they were in FIG. 7c.

Replication manager 140 may then repeat the steps illustrated in FIGS. 7c-7g to continue to perform an incremental replication of volume 700 at replica volume 750; that is, a relatively small amount of data, reflecting only the latest set of updates at volume 700, may be copied during each resynchronization of replica volume 750. The amount of data copied, and hence the impact of replication operations on normal operations, may be controlled by varying the interval between successive breakoff snapshot operations. If data is updated at volume 700 at a fairly uniform rate, longer intervals between successive breakoffs may result in larger amounts of data being copied to replica volume 750 during each synchronization step. In some embodiments, replication manager 140 may be configured to adjust the intervals between successive breakoff snapshots based on various factors, such as network or processor utilization and/or a count of update operations performed at volume 700. For example, during intervals when relatively few data blocks are updated at volume 700 (e.g., during a weekend or a holiday period, when fewer business transactions may be performed using volume 700 than during a typical weekday), replication manager 140 may be configured to schedule breakoff snapshots less frequently.

It is noted that other replication techniques utilizing mirror breakoffs, in addition to the incremental replication technique described above, may also be employed in different embodiments. In one embodiment, for example, only a single mirror (which may be termed a "transfer" mirror) may be used to copy data from a mirrored volume 180 at primary storage system 101 to replica storage system 102. One or more change tracking maps may be maintained on volume 180 to keep track of any updates at volume 180 since a previous synchronization with a replica volume 185. The transfer mirror may be broken off from volume 180 and attached at replica volume 185, and a change tracking map may be used to optimize the synchronization of the transfer mirror with replica volume 185 (i.e., to limit the amount of data copied during synchronization). After a successful synchronization, the transfer mirror may be broken off from replica volume 185 and reattached at volume 180, refreshed with changes made at volume 180 since it was last broken off, and re-used in the next breakoff/attach cycle.

The replication techniques described above, which may be used for disaster recovery, may also be used for a variety of other purposes in distributed block virtualization environments. In one embodiment, for example, replication techniques may be used to migrate a virtual storage hierarchy from one data center to another. In another embodiment, replication may be used to isolate application I/O traffic of different applications. For example, an online transaction processing (OLTP) system may update data stored within a given set of volumes, and a data mining application may require access to transaction data created at the OLTP system. Instead of allowing the data mining application to access the OLTP volumes, replica volumes may be created for use by the data mining application, thereby allowing OLTP processing to continue without interference from the data mining operation. In such an embodiment, replication link 144 may utilize a high-speed local area network (LAN) rather than a WAN as described earlier. In another embodiment, the replication techniques described above may be used to provide stable point-in-time images (e.g., frozen images) of data maintained within a volume.

Components of replication manager 140, such as primary replication manager component 141A and secondary replication manager 141B, may be executable at any suitable computer host or at an intelligent storage device. For example, replication manager components may be hosted at a server computer system that may include one or more processors and one or more system memories, where the server system is also configured to execute software such as one or more operating systems and/or applications. Components of replication manager 140 may also be hosted within one or more intelligent storage devices, such as an intelligent disk array and/or a virtualization switch in some embodiments. A volume server 130 (or 135) may be any device (such as a server computer system) capable of hosting software configured to provide the block virtualization functionality described earlier. Finally, a volume client 120 may be any type of device capable of interacting with a given volume 180 for data storage and retrieval. A volume client 120 may also be a server computer system in one embodiment, while in another embodiment a volume client 120 may be a client computer system configured to access a given volume 180 via a separate server computer system. In other embodiments, a volume client 120 may be an embedded system configured to use application specific integrated circuit (ASIC) or field-programmable gate array (FPGA) technology to execute operations whereby a given volume 180 may be accessed. Replication manager components, volume servers, and volume clients may be co-located in some embodiments: for example, a single server computer system may serve as a volume server 130, and may also host a volume client 120 as well as a component of replication manager 140. Numerous other configurations of replication manager 140, volume servers 130 and 135, and volume clients 120 are possible and contemplated.

FIG. 8 shows one embodiment of a computer-accessible medium comprising virtualization and replication software instructions 810, which, when executed, accomplish the functionality of replication manager 140, a volume server 130 and a volume client 120 as described above. Generally speaking, the computer-accessible medium may include storage media such as magnetic or optical media such as RAM (e.g., SDRAM, RDRAM, SRAM, etc.), ROM, etc., as well as transmission media or signals such as electrical, electromagnetic or digital signals, conveyed via a communication medium such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
a first and a second set of one or more physical block devices;
a first and a second volume server;
one or more volume clients; and
a replication manager,
wherein the first volume server is configured to:
aggregate storage in the first set of one or more physical block devices into one or more logical volumes including at least a mirrored volume comprising a plurality of mirrors, and
make the one or more logical volumes accessible to the one or more volume clients;
wherein the replication manager is configured to operate in cooperation with the first and second volume servers and the one or more volume clients to maintain a replica of at least a subset of the one or more logical volumes at the second set of one or more physical block devices;
wherein to maintain a replica of the mirrored volume, the replication manager is further configured to:
remove a first one of the mirrors from the mirrored volume, such that subsequent to removal of the first mirror, data updates to the mirrored volume are not stored to the first mirror; and
subsequent to removal of the first mirror, synchronize contents of the first mirror to a second logical volume at the second set of one or more physical block devices.

2. The system as recited in claim 1, wherein data required for the replica is transferred by or in cooperation with a first component of the replication manager from a primary data center to a second component of the replication manager at a secondary data center over a Wide Area Network (WAN).

3. The system as recited in claim 1, wherein data required for the replica is transferred by or in cooperation with a first component of the replication manager from a primary data center to a second component of the replication manager at a secondary data center over the Internet using Internet communication protocols.

4. The system as recited in claim 1, wherein the second volume server is configured to make the replica accessible to the one or more volume clients in response to an indication of a failure.

5. The system as recited in claim 1, wherein the second volume server is configured to make the replica accessible to the one or more volume clients in response to an administrative request.

6. The system as recited in claim 1, wherein the second volume server is configured to make the replica accessible to the one or more volume clients in response to a request for a stable point-in-time image.

7. The system as recited in claim 1, wherein the replication manager is further configured to operate in cooperation with the first volume server and the one or more volume clients to:
maintain one or more logs of a set of data write operations performed on the at least a subset of the one or more logical volumes, and
perform a set of replication write operations at the second set of one or more block devices in an order that preserves the contents of the one or more logs and does not violate write order fidelity.

8. The system as recited in claim 7, further comprising a plurality of nodes forming a cluster, wherein a volume client of the one or more volume clients is hosted at a first node of the cluster, and wherein the replication manager is further configured to:
designate a second node of the cluster as a log owner node;
maintain the one or more logs at the log owner node; and
direct a request for a data write operation of the set of data write operations from the volume client to the log owner node.

9. The system as recited in claim 8, wherein the replication manager is further configured to:
make an entry for the data write operation in a log of the one or more logs; and
send a message indicative of a successful completion of the data write operation to the volume client.

10. The system as recited in claim 1, wherein the replication manager is further configured to:
maintain a change tracking map indicative of data updates performed at the mirrored volume since a previous synchronization operation; and utilize the change tracking map to limit the data copied during a synchronization of the first mirror to the second logical volume.

11. The system as recited in claim 1, wherein the replication manager is further configured to:
remove a second mirror from the mirrored volume containing data updated after the first mirror was removed, such that subsequent to removal of the second mirror, data updates to the mirrored volume are not stored to the second mirror; and
subsequent to removal of the second mirror, synchronize contents of the second mirror with the second logical volume to replicate the data updated after the first mirror was removed to the second logical volume.

12. The system as recited in claim 1, wherein the replication manager is further configured to:
subsequent to synchronizing contents of the first mirror to the second logical volume, reattach the first mirror to the mirrored volume such that subsequent to reattachment of the first mirror, data updates to the mirrored volume are stored to the first mirror; and
subsequent to reattaching the first mirror, resynchronize the first mirror with remaining mirrors of the mirrored volume.

13. A method comprising:
aggregating storage in a first set of one or more physical block devices into one or more logical volumes including at least a mirrored volume comprising a plurality of mirrors;
making the one or more logical volumes accessible to one or more volume clients; and
maintaining a replica of at least a subset of the one or more logical volumes at a second set of one or more physical block devices;
removing a first mirror from the mirrored volume, such that subsequent to removal of the first mirror, data updates to the mirrored volume are not stored to the first mirror; and
subsequent to removal of the first mirror, synchronizing contents of the first mirror to a second logical volume at the second set of one or more physical block devices.

14. The method as recited in claim 13, further comprising:
transferring data required for the replica from a primary data center to a secondary data center over a Wide Area Network (WAN).

15. The method as recited in claim 13, wherein the replica is made accessible to the one or more volume clients in response to an indication of a failure.

16. The method as recited in claim 13, further comprising:
maintaining one or more logs of a set of data write operations performed on the at least a subset of the one or more logical volumes, and
performing a set of replication write operations at the second set of one or more block devices in an order that preserves the contents of the one or more logs and does not violate write order fidelity.

17. The method as recited in claim 16, further comprising:
hosting a volume client of the one or more volume clients at a first node of a cluster including a plurality of nodes;
designating a second node of the cluster as a log owner node;
maintaining the one or more logs at the log owner node; and
directing a request for a data write operation of the set of data write operations from the volume client to the log owner node.

18. The method as recited in claim 17, further comprising:
making an entry for a data write operation of the set of data write operations in a log of the one or more logs; and
sending a message indicative of a successful completion of the data write operation to the volume client.

19. The method as recited in claim 13, further comprising:
removing a second mirror from the mirrored volume containing data updated after the first mirror was removed, such that subsequent to removal of the second mirror, data updates to the mirrored volume are not stored to the second mirror;
subsequent to removal of the second mirror, synchronizing contents of the second mirror to the second logical volume to replicate the data updated after the first mirror was removed;
removing the first mirror from the mirrored volume containing data updated after the second mirror was removed to the second logical volume.

20. The method as recited in claim 13, further comprising:
subsequent to synchronizing contents of the first mirror to the second logical volume, reattaching the first mirror to the mirrored volume such that subsequent to reattachment of the first mirror, data updates to the mirrored volume are stored to the first mirror; and
subsequent to reattaching the first mirror, resynchronizing the first mirror with remaining mirrors of the mirrored volume.

21. A computer-accessible storage medium storing program instructions, wherein the program instructions are executable to:
aggregate storage in a first set of one or more physical block devices into one or more logical volumes including at least a mirrored volume comprising a plurality of mirrors;
make the one or more logical volumes accessible to one or more volume clients;
maintain a replica of at least a subset of the one or more logical volumes at a second set of one or more physical block devices;
wherein to maintain a replica of the mirrored volume, the program instructions are further executable to:
remove a first one of the mirrors from the mirrored volume, such that subsequent to removal of the first mirror, data updates to the mirrored volume are not stored to the first mirror; and
subsequent to removal of the first mirror, synchronize contents of the first mirror to a second logical volume at the second set of one or more physical block devices.

22. The computer-accessible storage medium as recited in claim 21, including additional program instructions executable to:
transfer data required for the replica from a primary data center to a secondary data center over a Wide Area Network (WAN).

23. The computer-accessible storage medium as recited in claim 21, including additional program instructions executable to:
maintain one or more logs of a set of data write operations performed on the at least a subset of the one or more logical volumes, and
perform a set of replication write operations at the second set of one or more block devices in an order that preserves the contents of the one or more logs and does not violate write order fidelity.

24. The computer-accessible storage medium as recited in claim 23, including additional program instructions executable to:

host a volume client of the one or more volume clients at a first node of a cluster including a plurality of nodes;
designate a second node of the cluster as a log owner node;
maintain the one or more logs at the log owner node; and
direct a request for a data write operation of the set of data write operations from the volume client to the log owner node.

25. The computer-accessible storage medium as recited in claim 23, including additional program instructions executable to:
make an entry for a data write operation of the set of data write operations in a log of the one or more logs; and
send a message indicative of a successful completion of the data write operation to the volume client.

26. The computer-readable storage medium as recited in claim 21, including additional program instructions executable to:
remove a second mirror from the mirrored volume containing data updated after the first mirror was removed, such that subsequent to removal of the second mirror, data updates to the mirrored volume are not stored to the second mirror;
subsequent to removal of the second mirror, synchronize contents of the second mirror with the second logical volume to replicate the data updated after the first mirror was removed to the second logical volume.

27. The computer-accessible storage medium as recited in claim 21, including additional program instructions executable to:
subsequent to synchronizing contents of the first mirror to the second logical volume, reattach the first mirror to the mirrored volume such that subsequent to reattachment of the first mirror, data updates to the mirrored volume are stored to the first mirror; and
subsequent to reattaching the first mirror, resynchronize the first mirror with remaining mirrors of the mirrored volume.

* * * * *

UNITED STATES PATENT AND TRADEMARK OFFICE
CERTIFICATE OF CORRECTION

PATENT NO. : 7,657,578 B1  Page 1 of 1
APPLICATION NO. : 11/017356
DATED : February 2, 2010
INVENTOR(S) : Karr et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1308 days.

Signed and Sealed this

Thirtieth Day of November, 2010

David J. Kappos
*Director of the United States Patent and Trademark Office*